US009845589B2

(12) United States Patent
Tsuruga et al.

(10) Patent No.: US 9,845,589 B2
(45) Date of Patent: Dec. 19, 2017

(54) HYDRAULIC DRIVE SYSTEM FOR CONSTRUCTION MACHINE

(71) Applicant: Hitachi Construction Machinery Tierra Co., Ltd., Koka-shi (JP)

(72) Inventors: Yasutaka Tsuruga, Moriyama (JP); Kiwamu Takahashi, Koka (JP)

(73) Assignee: Hitachi Construction Machinery Tierra Co., Ltd., Koka-shi (JP)

( * ) Notice: Subject to any disclaimer, the term of this patent is extended or adjusted under 35 U.S.C. 154(b) by 310 days.

(21) Appl. No.: 14/417,977

(22) PCT Filed: Jun. 19, 2013

(86) PCT No.: PCT/JP2013/066835
§ 371 (c)(1),
(2) Date: Jan. 28, 2015

(87) PCT Pub. No.: WO2014/021015
PCT Pub. Date: Feb. 6, 2014

(65) Prior Publication Data

US 2015/0204054 A1 Jul. 23, 2015

(30) Foreign Application Priority Data

Jul. 31, 2012 (JP) ................................ 2012-169577

(51) Int. Cl.
*F16D 31/02* (2006.01)
*E02F 9/22* (2006.01)
(Continued)

(52) U.S. Cl.
CPC ............ *E02F 9/2292* (2013.01); *E02F 3/325* (2013.01); *E02F 3/425* (2013.01); *E02F 3/964* (2013.01);
(Continued)

(58) Field of Classification Search
CPC ........ F15B 11/165; F15B 11/167; F15B 11/17
See application file for complete search history.

(56) References Cited

U.S. PATENT DOCUMENTS

| | | | | |
|---|---|---|---|---|
| 7,500,360 | B2 * | 3/2009 | Udagawa | F15B 11/165 60/421 |
| 8,701,399 | B2 * | 4/2014 | Horii | F15B 11/165 60/421 |
| 2012/0067443 | A1 | 3/2012 | Horii | |

FOREIGN PATENT DOCUMENTS

| | | |
|---|---|---|
| JP | 61-204427 A | 9/1986 |
| JP | 3-273968 A | 12/1991 |

(Continued)

OTHER PUBLICATIONS

International Preliminary Report on Patentability (PCT/IB/373) with Written Opinion (PCT/IB/237) dated Feb. 12, 2015 (eight (8) pages).

(Continued)

*Primary Examiner* — Michael Leslie
(74) *Attorney, Agent, or Firm* — Crowell & Moring LLP

(57) ABSTRACT

In a hydraulic drive system performing the load sensing control by using a pump device having two delivery ports whose delivery flow rates are controlled by a single pump controller, surplus flow is prevented and energy loss at an unload valve and a pressure compensating valve is reduced in combined operations in which two actuators are driven at the same time while producing a relatively large supply flow rate difference therebetween. A boom cylinder 3*a* is connected so that the hydraulic fluids delivered from delivery ports P1 and P2 of a pump device 1*a* are merged and supplied to the boom cylinder 3*a*. An arm cylinder 3*h* is connected so that the hydraulic fluids delivered from delivery ports P3 and P4 of a pump device 1*b* are merged and supplied to the arm cylinder 3*h*. A travel motor 3*d* is
(Continued)

connected so that the hydraulic fluid delivered from one (delivery port P2) of the delivery ports of the pump device 1*a* and the hydraulic fluid delivered from one (delivery port P4) of the delivery ports of the pump device 1*b* are merged and supplied to the travel motor 3*d*. A travel motor 3*e* is connected so that the hydraulic fluid delivered from the other (delivery port P1) of the delivery ports of the pump device 1*a* and the hydraulic fluid delivered from the other (delivery port P3) of the delivery ports of the pump device 1*b* are merged and supplied to the travel motor 3*e*.

7 Claims, 10 Drawing Sheets

(51) Int. Cl.

| | |
|---|---|
| ***F15B 11/16*** | (2006.01) |
| ***E02F 3/32*** | (2006.01) |
| ***E02F 3/96*** | (2006.01) |
| ***F15B 11/17*** | (2006.01) |
| ***E02F 3/42*** | (2006.01) |
| ***E02F 9/02*** | (2006.01) |
| ***F15B 9/17*** | (2006.01) |

(52) U.S. Cl.

CPC .............. *E02F 9/02* (2013.01); *E02F 9/2239* (2013.01); *E02F 9/2296* (2013.01); *F15B 9/17* (2013.01); *F15B 11/165* (2013.01); *F15B 11/17* (2013.01); *F15B 2211/2053* (2013.01); *F15B 2211/20523* (2013.01); *F15B 2211/20553* (2013.01); *F15B 2211/20576* (2013.01); *F15B 2211/2656* (2013.01); *F15B 2211/30535* (2013.01); *F15B 2211/30565* (2013.01); *F15B 2211/50536* (2013.01); *F15B 2211/6054* (2013.01); *F15B 2211/7135* (2013.01); *F15B 2211/7142* (2013.01)

(56) References Cited

FOREIGN PATENT DOCUMENTS

| | | | |
|---|---|---|---|
| JP | 2002-317471 | A | 10/2002 |
| JP | 2012-31753 | A | 2/2012 |
| JP | 2012-67459 | A | 4/2012 |
| JP | 2014-45665 | A | 3/2014 |

OTHER PUBLICATIONS

International Search Report (PCT/ISA/210) dated Sep. 24, 2013, with English translation (three (3) pages).

Japanese Office Action issued in counterpart Japanese Application No. 2014-528042 dated Mar. 8, 2016 (three (3) pages).

* cited by examiner

SECOND EMBODIMENT

THIRD EMBODIMENT

HYDRAULIC DRIVE SYSTEM FOR CONSTRUCTION MACHINE

TECHNICAL FIELD

The present invention relates to a hydraulic drive system for a construction machine such as a hydraulic excavator. In particular, the invention relates to a hydraulic drive system for a construction machine comprising a pump device which has two delivery ports whose delivery flow rates are controlled by a single pump regulator (pump controller), and a load sensing system which controls delivery pressures of the pump device to be higher than the maximum load pressure of actuators.

BACKGROUND ART

For example, Patent Literature 1 describes a hydraulic drive system for a construction machine comprising a pump device which has two delivery ports whose delivery flow rates are controlled by a single pump regulator, and a load sensing system which controls delivery pressures of the pump device to be higher than the maximum load pressure of actuators. In the Patent Literature 1, a hydraulic pump of the split flow type is used as the pump device having two delivery ports. The split flow type hydraulic pump, including only one pump regulator and only one swash plate (displacement control mechanism), controls the delivery flow rates of the two delivery ports by adjusting the tilting angle of the single swash plate (displacement) with the single pump regulator, thereby implementing a pump function of two pumps with a compact structure.

PRIOR ART LITERATURE

Patent Literature

Patent Literature 1: JP, A 2012-67459

SUMMARY OF THE INVENTION

Problem to be Solved by the Invention

For example, such a split flow type hydraulic pump is used in a hydraulic drive system comprising a load sensing system, and the hydraulic circuit is configured so that hydraulic fluids delivered from the two delivery ports are separately led to different actuators. In this example, for a combined operation in which two actuators are driven at the same time while producing a relatively large supply flow rate difference therebetween (e.g., leveling operation performed by a hydraulic excavator by use of a boom and an arm), the demanded flow rate on the high flow rate actuator's side (arm cylinder's side) is given high priority and the swash plate of the hydraulic pump is controlled to increase the tilting angle.

In such a case, a surplus flow occurs in the pump flow delivered from the delivery port on the low flow rate actuator's side. The surplus flow is drained to a tank by an unload valve, causing part of the energy consumption by the hydraulic pump.

As above, in cases where a split flow type hydraulic pump is used in a hydraulic drive system comprising a load sensing system and the hydraulic circuit is configured so that the hydraulic fluids delivered from the two delivery ports are separately led to different actuators, a surplus flow occurs in such a combined operation in which two actuators are driven at the same time while producing a relatively large supply flow rate difference therebetween. The surplus flow is equivalent to energy loss. The load sensing system's original function of preventing the surplus flow is impaired in such a combined operation.

In the Patent Literature 1, in combined operations other than those using a traveling unit and/or a dozer unit, the delivery flows from the two delivery ports of the split flow type hydraulic pump are merged together so that the two delivery ports function as one pump. Therefore, the delivery flow rate of the hydraulic pump is controlled without causing the surplus flow in combined operations such as the leveling operation performed by use of the boom and the arm. However, in combined operations in which two actuators are driven at the same time, the load pressures of the actuators differ from each other in many cases. For example, in the leveling combined operation performed by use of the boom and the arm, the boom cylinder operates as the high load pressure side and the arm cylinder operates as the low load pressure side. When such a combined operation driving a high load pressure actuator and a low load pressure actuator in combination is carried out by a hydraulic drive system having a load sensing system, the delivery pressures of the hydraulic pump are controlled to be higher than the high load pressure of the boom cylinder by a certain preset pressure. In this case, a pressure compensating valve that is provided for driving the arm cylinder and preventing excessive flow to the arm cylinder at the low load pressure is throttled. Thus, energy loss is caused by the pressure loss at the pressure compensating valve.

It is therefore the primary object of the present invention to provide a hydraulic drive system for a construction machine that performs the load sensing control by using a pump device having two delivery ports whose delivery flow rates are controlled by a single pump controller and that is capable of preventing the surplus flow and reducing the energy loss at the unload valve and the pressure compensating valve in combined operations in which two actuators are driven at the same time while producing a relatively large supply flow rate difference therebetween.

Means for Solving the Problem

To achieve the above object, the present invention provides a hydraulic drive system for a construction machine, comprising: a first pump device having first and second delivery ports; a second pump device having third and fourth delivery ports; and a plurality of actuators which are driven by hydraulic fluid delivered from the first and second delivery ports of the first pump device and hydraulic fluid delivered from the third and fourth delivery ports of the second pump device. The first pump device includes a first pump controller which is provided for the first and second delivery ports as a common controller. The second pump device includes a second pump controller which is provided for the third and fourth delivery ports as a common controller. The first pump controller includes a first load sensing control unit which controls displacement of the first hydraulic pump device so that delivery pressures of the first and second delivery ports of the first hydraulic pump device become higher than maximum load pressure of the actuators driven by the hydraulic fluid delivered from the first and second delivery ports by a prescribed pressure and a first torque control unit which performs limiting control of the displacement of the first hydraulic pump device so that absorption torque of the first hydraulic pump device does not exceed a prescribed value. The second pump controller includes a second load sensing control unit which controls displacement of the second hydraulic pump device so that delivery pressures of the third and fourth delivery ports of the second hydraulic pump device become higher than maximum load pressure of the actuators driven by the hydraulic fluid delivered from the third and fourth delivery ports by a prescribed pressure and a second torque control unit which performs limiting control of the displacement of the second hydraulic pump device so that absorption torque of the second hydraulic pump device does not exceed a prescribed value. The plurality of actuators include first and second actuators which are driven at the same time in a certain combined operation of the construction machine while producing a relatively large supply flow rate difference therebetween. The first actuator is connected so that hydraulic fluids delivered from the first and second delivery ports of the first pump device are merged and supplied to the first actuator. The second actuator is connected so that hydraulic fluids delivered from the third and fourth delivery ports of the second pump device are merged and supplied to the second actuator.

In the above configuration, the hydraulic drive system comprises two pump devices each having two delivery ports. Each of the first and second pump devices is equipped with a pump controller. One of the first and second actuators driven at the same time in a certain combined operation of the construction machine while producing a relatively large supply flow rate difference therebetween (first actuator) is connected so that hydraulic fluids delivered from the first and second delivery ports of the first pump device are merged and supplied to the actuator. The other actuator (second actuator) is connected so that hydraulic fluids delivered from the third and fourth delivery ports of the second pump device are merged and supplied to the actuator. With this configuration, in the simultaneous driving of the first and second actuators, the load sensing control by the first/second load sensing control unit and the constant absorption torque control by the first/second torque control unit can be performed on the first pump device's side and on the second pump device's side independently of each other. In combined operations in which the two actuators need a high flow rate and a low flow rate, respectively (e.g., leveling combined operation), each of the first and second pump devices delivers only the necessary flow rates, no surplus flow is caused, and energy loss can be reduced.

Further, when a combined operation driving a high load pressure actuator and a low load pressure actuator at the same time in the leveling combined operation is performed, the delivery pressure of the pump device on the low load pressure actuator's side can be controlled independently. Consequently, energy loss caused by the pressure loss at pressure compensating valves of the low load pressure actuator can be reduced.

Preferably, the plurality of actuators include third and fourth actuators which are driven at the same time in another operation of the construction machine while achieving a prescribed function by their supply flow rates becoming equivalent to each other. The third actuator is connected so that hydraulic fluid delivered from one of the first and second delivery ports of the first pump device and hydraulic fluid delivered from one of the third and fourth delivery ports of the second pump device are merged and supplied to the third actuator. The fourth actuator is connected so that hydraulic fluid delivered from the other of the first and second delivery ports of the first pump device and hydraulic fluid delivered from the other of the third and fourth delivery ports of the second pump device are merged and supplied to the fourth actuator.

In the above configuration, one of the third and fourth actuators driven at the same time while achieving a prescribed function by their supply flow rates capable of becoming equivalent to each other (third actuator) is connected so that hydraulic fluid delivered from one of the first and second delivery ports of the first pump device and hydraulic fluid delivered from one of the third and fourth delivery ports of the second pump device are merged and supplied to the actuator. The other actuator (fourth actuator) is connected so that hydraulic fluid delivered from the other of the first and second delivery ports of the first pump device and hydraulic fluid delivered from the other of the third and fourth delivery ports of the second pump device are merged and supplied to the actuator. With this configuration, even when the load pressure of one of the third and fourth actuators changed, the average delivery pressure of the first and second delivery ports and that of the third and fourth delivery ports are equal to each other. Thus, even when the constant absorption torque control by the first and second torque control units is in operation, the delivery flow rate of the first and second delivery ports and that of the third and fourth delivery ports become equal to each other and the third and fourth actuators can achieve the intended prescribed function.

Further, thanks to the above-described connection of the third and fourth actuators, even when a delivery flow rate difference occurred between the first and second delivery ports and the third and fourth delivery ports, the supply flow rate of the third actuator and that of the fourth actuator become equal to each other, by which the third and fourth actuators are allowed to achieve the intended prescribed function.

Furthermore, even in cases where the displacements of the first and second pump devices are designed to be different from each other, optimum design of the first and second pump devices becomes possible since the supply flow rates of the third and fourth actuators are kept equal to each other and the third and fourth actuators are allowed to achieve the intended prescribed function.

Preferably, the hydraulic drive system in accordance with the present invention further comprises: a first travel communication valve which is arranged between the first and second delivery ports of the first pump device, situated at an interrupting position for interrupting communication between the first and second delivery ports at the time other than combined operation in which the third and fourth actuators and at least one of other actuators related to the first pump device are driven at the same time, and switched to a communicating position for communicating the first and second delivery ports to each other at the time of the combined operation in which the third and fourth actuators and at least one of other actuators related to the first pump device are driven at the same time; and a second travel communication valve which is arranged between the third and fourth delivery ports of the second pump device, situated at an interrupting position for interrupting communication between the third and fourth delivery ports at the time other than combined operation in which the third and fourth actuators and at least one of other actuators related to the second pump device are driven at the same time, and switched to a communicating position for communicating the third and fourth delivery ports to each other at the time of the combined operation in which the third and fourth actuators and at least one of other actuators related to the second pump device are driven at the same time.

With this configuration, when the combined operation driving the third and fourth actuators and another actuator at the same time is performed, the supply flow rate of the third actuator and that of the fourth actuator are kept equal to each other, by which the third and fourth actuators are allowed to achieve the intended prescribed function.

Preferably, the construction machine is a hydraulic excavator having a front work implement, the first actuator is a boom cylinder for driving a boom of the front work implement, and the second actuator is an arm cylinder for driving an arm of the front work implement.

With this configuration, no surplus flow is caused and flow rate control with no energy loss becomes possible in combined operations in which the arm cylinder needs a high flow rate and the boom cylinder needs a low flow rate as in the leveling operation by use of the boom and the arm.

Preferably, the construction machine is a hydraulic excavator having a lower track structure equipped with left and right crawlers, the third actuator is a travel motor for driving one of the left and right crawlers, and the fourth actuator is a travel motor for driving the other of the left and right crawlers.

With this configuration, the vehicle is allowed to travel straight without meandering even when the load pressure of one of the left and right travel motors becomes high in the straight traveling operation for the reasons such that one of the left and right crawlers has run on an obstacle.

Further, the vehicle is allowed to travel straight without meandering even when a traveling combined operation is performed.

Preferably, each of the first and second pump devices is a hydraulic pump of the split flow type having a single displacement control mechanism.

A hydraulic pump of the split flow type, including only one pump controller and only one swash plate that is a displacement control element, is capable of implementing a pump function of two pumps with a compact structure. By configuring the first and second pump devices by using two hydraulic pumps of the split flow type, a pump function of four pumps can be implemented with a compact structure.

Preferably, the first pump torque control unit of the first pump device controls the displacement of the first hydraulic pump device so that total absorption torque of the first and second hydraulic pump devices does not exceed a prescribed value by feeding back not only the delivery pressures of the first and second delivery ports of the first hydraulic pump device related to itself but also the delivery pressures of the third and fourth delivery ports of the second hydraulic pump device, and the second pump torque control unit of the second pump device controls the displacement of the second hydraulic pump device so that total absorption torque of the first and second hydraulic pump devices does not exceed a prescribed value by feeding back not only the delivery pressures of the third and fourth delivery ports of the second hydraulic pump device related to itself but also the delivery pressures of the first and second delivery ports of the first hydraulic pump device.

With this configuration, the engine stall is prevented when an actuator related to the first pump device and an actuator related to the second pump device are driven at the same time. Further, the output torque of the prime mover can be fully utilized while preventing the stall of the prime mover in cases where only actuators related to the first pump device are driven and in cases where only actuators related to the second pump device are driven.

Effect of the Invention

According to the present invention, in a hydraulic drive system performing the load sensing control by using a pump device having two delivery ports whose delivery flow rates are controlled by a single pump controller, the surplus flow can be prevented and the energy loss can be reduced in combined operations in which two actuators are driven at the same time while producing a relatively large supply flow rate difference therebetween.

According to the present invention, in a combined operation in which two actuators are driven at the same time while achieving a prescribed function by their supply flow rates becoming equivalent to each other, even when the load pressure of one of the two actuators gets high, the supply flow rates to the two actuators become equal to each other and the intended prescribed function can be achieved.

According to the present invention, when a combined operation driving the third and fourth actuators and another actuator at the same time is performed, the supply flow rate of the third actuator and that of the fourth actuator become equal to each other and the third and fourth actuators are allowed to achieve the intended prescribed function.

According to the present invention, the surplus flow can be prevented and the energy loss can be reduced in combined operations in which the arm cylinder needs a high flow rate and the boom cylinder needs a low flow rate as in the leveling operation by use of the boom and the arm.

According to the present invention, the vehicle is allowed to travel straight without meandering even when the load pressure of one of the left and right travel motors becomes high in the straight traveling operation for the reasons such that one of the left and right crawlers has run on an obstacle).

According to the present invention, the vehicle is allowed to travel straight without meandering even when the traveling combined operation is performed.

MODE FOR CARRYING OUT THE INVENTION

Figure 1:
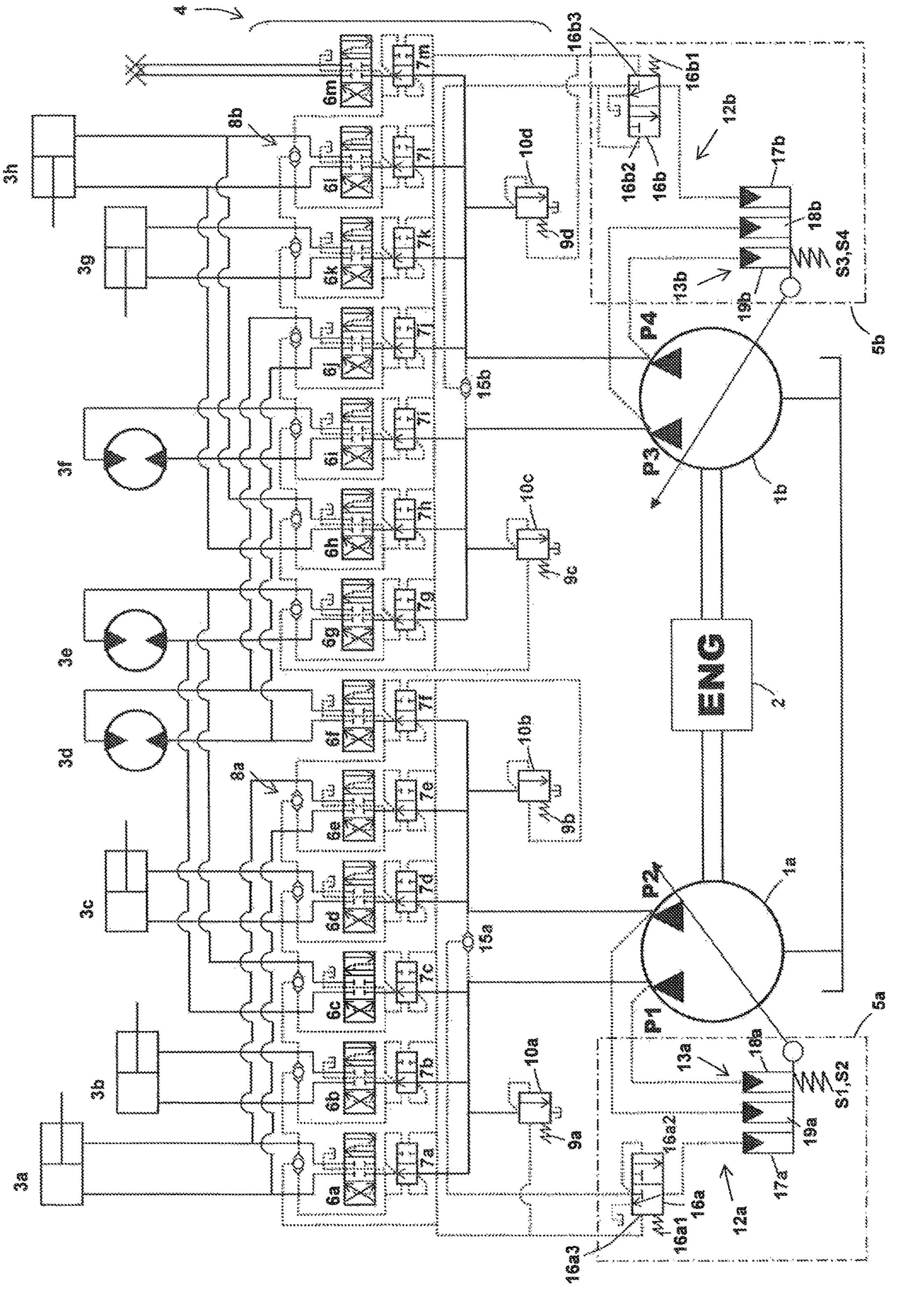
FIG. 1 is a schematic view showing a hydraulic drive system for a hydraulic excavator (construction machine) in accordance with a first embodiment of the present invention.

Referring now to the drawings, a description will be given in detail of preferred embodiments of the present invention.

First Embodiment

Configuration

FIG. 1 shows a hydraulic drive system for a hydraulic excavator (construction machine) in accordance with a first embodiment of the present invention.

Referring to FIG. 1, the hydraulic drive system according to the first embodiment comprises a first pump device 1*a* of the variable displacement type having two delivery ports of a first delivery port P1 and a second delivery port P2, a second pump device 1*b* of the variable displacement type having two delivery ports of a third delivery port P3 and fourth delivery port P4, a prime mover 2, a plurality of actuators 3*a*-3*h*, and a control valve 4. The prime mover 2 is connected to the first and second pump devices 1*a* and 1*b* to drive the first and second pump devices 1*a* and 1*b*. The actuators 3*a*-3*h* are driven by hydraulic fluid delivered from the first and second delivery ports P1 and P2 of the first pump device 1*a* and hydraulic fluid delivered from the third and fourth delivery ports P3 and P4 of the second pump device 1*b*. The control valve 4 is arranged between the first through fourth delivery ports P1-P4 of the first and second pump devices 1*a* and 1*b* and the actuators 3*a*-3*h* in order to control the flow of the hydraulic fluid supplied from the first through fourth delivery ports P1-P4 to the actuators 3*a*-3*h*.

The displacement of the first pump device 1*a* and that of the second pump device 1*b* are equal to each other. However, the displacement of the first pump device 1*a* and that of the second pump device 1*b* may also be designed to differ from each other.

The first pump device 1*a* is equipped with a first pump controller 5*a* which is provided for the first and second delivery ports P1 and P2 as a common controller. Similarly, the second pump device 1*b* is equipped with a second pump controller 5*b* which is provided for the third and fourth delivery ports P3 and P4 as a common controller.

The first pump device 1*a* is a hydraulic pump of the split flow type having a single displacement control mechanism (swash plate). The first pump controller 5*a* controls the delivery flow rates of the first and second delivery ports P1 and P2 by driving the single displacement control mechanism and controlling the displacement of the first pump device 1*a* (tilting angle of the swash plate). Similarly, the second pump device 1*b* is a hydraulic pump of the split flow type having a single displacement control mechanism (swash plate). The second pump controller 5*b* controls the delivery flow rates of the third and fourth delivery ports P3 and P4 by driving the single displacement control mechanism and controlling the displacement of the second pump device 1*b* (tilting angle of the swash plate).

Each of the first and second pump devices 1*a* and 1*b* may also be formed by a combination of two variable displacement hydraulic pumps each having one delivery port. In this case, the first pump controller 5*a* may be used for driving the two displacement control mechanisms (swash plates) of the two hydraulic pumps of the first pump device 1*a*, and the second pump controller 5*b* may be used for driving the two displacement control mechanisms (swash plates) of the two hydraulic pumps of the second pump device 1*b*.

The prime mover 2 is implemented by a diesel engine, for example. As is publicly known, a diesel engine is equipped with an electronic governor or the like which controls the fuel injection quantity. The revolution speed and the torque of the diesel engine are controlled through the control of the fuel injection quantity. The engine revolution speed is set by use of operation means such as an engine control dial. The prime mover 2 may also be implemented by an electric motor.

The control valve 4 includes flow control valves 6*a*-6*m* of the closed center type, pressure compensating valves 7*a*-7*m*, first and second shuttle valve sets 8*a* and 8*b*, and first through fourth unload valves 10*a*-10*d*. Each pressure compensating valve 7*a*-7*m* is connected upstream of each flow control valve 6*a*-6*m* to control the differential pressure across the meter-in throttling portion of the flow control valve 6*a*-6*m*. The first shuttle valve set 8*a* is connected to the load pressure ports of the flow control valves 6*a*-6*f* to detect the maximum load pressure of the actuators 3*a*-3*e*. The second shuttle valve set 8*b* is connected to the load pressure ports of the flow control valves 6*g*-6*m* to detect the maximum load pressure of the actuators 3*d*-3*h*. The first and second unload valves 10*a* and 10*b* are connected respectively to the delivery ports P1 and P2 of the first pump device 1*a*. When the delivery pressure of the delivery port P1, P2 exceeds a pressure as the sum of the maximum load pressure and a preset pressure (unload pressure) of a spring 9*a*, 9*b*, the unload valve 10*a*, 10*b* shifts to an open state, returns the hydraulic fluid delivered from the delivery port P1, P2 to a tank, and thereby limits the increase in the delivery pressure. The third and fourth unload valves 10*c* and 10*d* are connected respectively to the delivery ports P3 and P4 of the second pump device 1*b*. When the delivery pressure of the delivery port P3, P4 exceeds a pressure as the sum of the maximum load pressure and a preset pressure (unload pressure) of a spring 9*c*, 9*d*, the unload valve 10*c*, 10*d* shifts to an open state, returns the hydraulic fluid delivered from the delivery port P3, P4 to the tank, and thereby limits the increase in the delivery pressure. The preset pressures of the springs 9*a*-9*d* of the first through fourth unload valves 10*a*-10*d* have been set equal to or slightly higher than a target differential pressure of the load sensing control which will be explained later.

Although not shown in FIG. 1, the control valve 4 further includes first through fourth relief valves. The first and second relief valves are connected respectively to the delivery ports P1 and P2 of the first pump device 1*a* to function as safety valves. The third and fourth relief valves are connected respectively to the delivery ports P3 and P4 of the second pump device 1*b* to function as safety valves.

The first pump controller 5*a* includes a first load sensing control unit 12*a* and a first torque control unit 13*a*. The first load sensing control unit 12*a* controls the swash plate tilting angle (displacement) of the first pump device 1*a* so that the delivery pressures of the first and second delivery ports P1 and P2 of the first pump device 1*a* become higher by a prescribed pressure than the maximum load pressure of the actuators 3*a*-3*e* that are the actuators driven by the hydraulic fluid delivered from the first and second delivery ports P1 and P2. The first torque control unit 13*a* performs limiting control of the swash plate tilting angle (displacement) of the first pump device 1*a* so that the absorption torque of the first pump device 1*a* does not exceed a prescribed value.

The second pump controller 5*b* includes a second load sensing control unit 12*b* and a second torque control unit 13*b*. The second load sensing control unit 12*b* controls the swash plate tilting angle (displacement) of the second pump device 1*b* so that the delivery pressures of the third and fourth delivery ports P3 and P4 of the second pump device 1*b* become higher by a prescribed pressure than the maximum load pressure of the actuators 3*d*-3*h* that are the actuators driven by the hydraulic fluid delivered from the third and fourth delivery ports P3 and P4. The second torque control unit 13*b* performs the limiting control of the swash plate tilting angle (displacement) of the second pump device 1*b* so that the absorption torque of the second pump device 1*b* does not exceed a prescribed value.

The first load sensing control unit 12*a* includes a shuttle valve 15*a*, a load sensing control valve 16*a*, and a load sensing control piston 17*a*. The shuttle valve 15*a* detects the delivery pressure of one of the first and second delivery ports P1 and P2 that is on the high pressure side. The output pressure of the control valve 16*a* is led to the load sensing control piston 17*a*. The load sensing control piston 17*a* changes the swash plate tilting angle of the first pump device 1*a* according to the output pressure of the control valve 16*a*.

The second load sensing control unit 12*b* includes a shuttle valve 15*b*, a load sensing control valve 16*b*, and a load sensing control piston 17*b*. The shuttle valve 15*b* detects the delivery pressure of one of the third and fourth delivery ports P3 and P4 that is on the high pressure side. The output pressure of the control valve 16*b* is led to the load sensing control piston 17*b*. The load sensing control piston 17*b* changes the swash plate tilting angle of the second pump device 1*b* according to the output pressure of the control valve 16*b*.

The control valve 16*a* of the first load sensing control unit 12*a* includes a spring 16*a*1 for setting the target differential pressure of the load sensing control, a pressure receiving part 16*a*2 situated opposite to the spring 16*a*1, and a pressure receiving part 16*a*3 situated on the same side as the spring 16*a*1. The delivery pressure of one of the first and second delivery ports P1 and P2 on the high pressure side detected by the shuttle valve 15*a* is led to the pressure receiving part 16*a*2. The maximum load pressure of the actuators 3*a*-3*e* detected by the first shuttle valve set 8*a* is led to the pressure receiving part 16*a*3. When the delivery pressure of one of the first and second delivery ports P1 and P2 on the high pressure side which is led to the pressure receiving part 16*a*2 exceeds a pressure as the sum of the maximum load pressure of the actuators 3*a*-3*e* led to the pressure receiving part 16*a*3 and the target differential pressure (prescribed pressure) set by the spring 16*a*1, the control valve 16*a* moves leftward in FIG. 1 and increases its output pressure. When the delivery pressure of one of the first and second delivery ports P1 and P2 on the high pressure side led to the pressure receiving part 16*a*2 falls below the pressure as the sum of the maximum load pressure of the actuators 3*a*-3*e* led to the pressure receiving part 16*a*3 and the target differential pressure (prescribed pressure) set by the spring 16*a*1, the control valve 16*a* moves rightward in FIG. 1 and decreases its output pressure. With the increase in the output pressure of the control valve 16*a*, the load sensing control piston 17*a* decreases the swash plate tilting angle of the first pump device 1*a* and thereby decreases the delivery flow rates of the first and second delivery ports P1 and P2. With the decrease in the output pressure of the control valve 16*a*, the load sensing control piston 17*a* increases the swash plate tilting angle of the first pump device 1*a* and thereby increases the delivery flow rates of the first and second delivery ports P1 and P2. With the above configuration, the first load sensing control unit 12*a* controls the swash plate tilting angle (displacement) of the first pump device 1*a* so that the delivery pressures of the first and second delivery ports P1 and P2 of the first pump device 1*a* become higher by the prescribed pressure than the maximum load pressure of the actuators 3*a*-3*e* driven by the hydraulic fluid delivered from the first and second delivery ports P1 and P2. The target differential pressure of the load sensing control that is set by the spring 16*a*1 is approximately 2 MPa, for example.

The control valve 16*b* of the second load sensing control unit 12*b* includes a spring 16*b*1 for setting the target differential pressure of the load sensing control, a pressure receiving part 16*b*2 situated opposite to the spring 16*b*1, and a pressure receiving part 16*b*3 situated on the same side as the spring 16*b*1. The delivery pressure of one of the third and fourth delivery ports P3 and P4 on the high pressure side detected by the shuttle valve 15*b* is led to the pressure receiving part 16*b*2. The maximum load pressure of the actuators 3*d*-3*h* detected by the second shuttle valve set 8*b* is led to the pressure receiving part 16*b*3. The control valve 16*b* and the control piston 17*b* operate similarly to the control valve 16*a* and the control piston 17*a* of the first load sensing control unit 12*a* explained above. With the above configuration, the second load sensing control unit 12*b* controls the swash plate tilting angle (displacement) of the second pump device 1*b* so that the delivery pressures of the third and fourth delivery ports P3 and P4 of the second pump device 1*b* become higher by the prescribed pressure than the maximum load pressure of the actuators 3*d*-3*h* driven by the hydraulic fluid delivered from the third and fourth delivery ports P3 and P4.

The first torque control unit 13*a* includes a first torque control piston 18*a* to which the delivery pressure of the first delivery port P1 is led and a second torque control piston 19*a* to which the delivery pressure of the second delivery port P2 is led. When the average delivery pressure (P1*p*+P2*p*)/2 of the first and second delivery ports P1 and P2 of the first pump device 1*a* exceeds a prescribed pressure Pa, the first torque control unit 13*a* executes control so as to decrease the swash plate tilting angle of the first pump device 1*a* with the increase in the average delivery pressure.

The second torque control unit 13*b* includes a third torque control piston 18*b* to which the delivery pressure of the third delivery port P3 is led and a fourth torque control piston 19*b* to which the delivery pressure of the fourth delivery port P4 is led. When the average delivery pressure (P3*p*+P4*p*)/2 of the third and fourth delivery ports P3 and P4 of the second pump device 1*b* exceeds the prescribed pressure Pa, the second torque control unit 13*b* executes control so as to decrease the swash plate tilting angle of the second pump device 1*b* with the increase in the average delivery pressure.

Figure 2A:
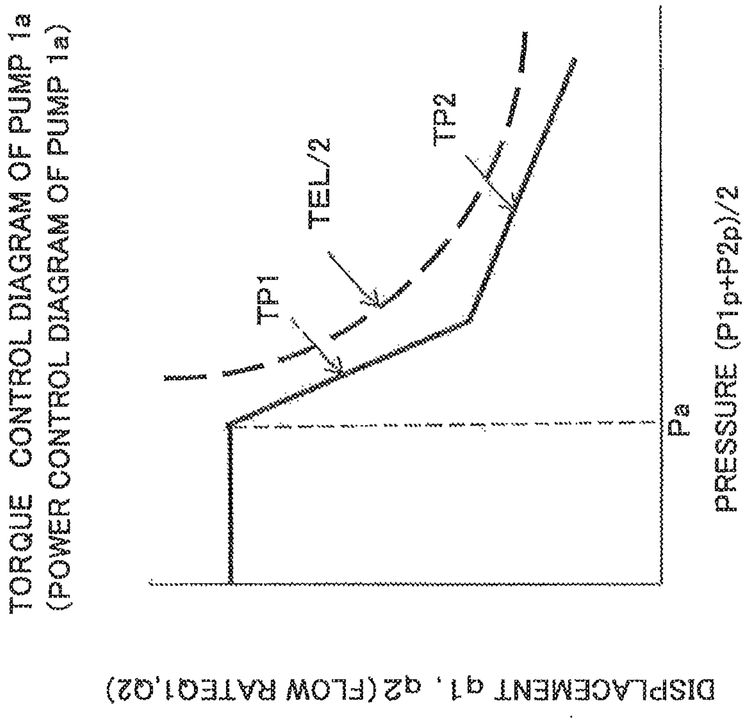
FIG. 2A is a torque control diagram of a first torque control unit of a first pump device.
Figure 2B:
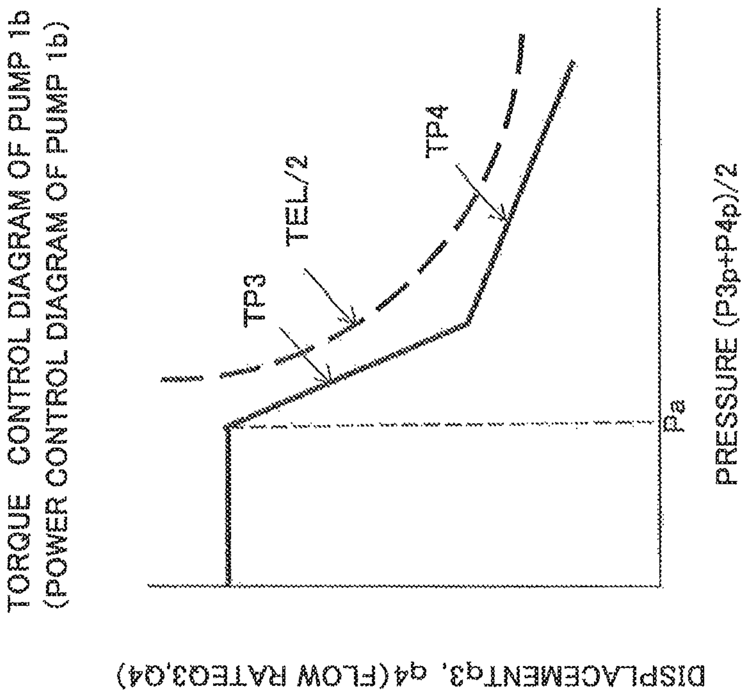
FIG. 2B is a torque control diagram of a second torque control unit of a second pump device.

FIG. 2A is a torque control diagram of the first torque control unit 13*a*. FIG. 2B is a torque control diagram of the second torque control unit 13*b*. In each torque control diagram, the vertical axis represents the tilting angle (displacement) q. If the vertical axis is replaced with the delivery flow rate, these diagrams become power control diagrams.

Referring to FIG. 2A, the first torque control unit 13*a* does not operate when the average delivery pressure of the first and second delivery ports P1 and P2 is Pa or less. In this case, the swash plate tilting angle (displacement) of the first pump device 1*a* is controlled by the first load sensing control unit 12*a* with no limitation by the first torque control unit 13*a* and can increase up to the maximum tilting angle qmax of the first pump device 1*a* according to the operation amount of the control lever device (demanded flow rate).

When the average delivery pressure of the first and second delivery ports P1 and P2 exceeds Pa, the first torque control unit 13*a* operates. With the increase in the average delivery pressure, the first torque control unit 13*a* performs the limiting control of the maximum tilting angle (maximum displacement) of the first pump device 1*a* so as to decrease the maximum tilting angle (maximum displacement) along the characteristic lines TP1 and TP2. In this case, due to the limiting control by the first torque control unit 13*a*, the first load sensing control unit 12*a* cannot increase the tilting angle of the first pump device 1*a* over a tilting angle specified by the characteristic lines TP1 and TP2.

The characteristic lines TP1 and TP2 have been set by two springs S1 and S2 (represented by one spring in FIG. 1 for simplicity of illustration) to approximate a constant absorption torque curve (hyperbolic curve). The setup torque of the characteristic lines TP1 and TP2 is substantially constant. Accordingly, the first torque control unit 13*a* executes constant absorption torque control (or constant power control) by decreasing the maximum tilting angle of the first pump device 1*a* along the characteristic lines TP1 and TP2 with the increase in the average delivery pressure.

The second torque control unit 13*b* also operates in the same way as the first torque control unit 13*a*. As shown in FIG. 2B, the second torque control unit 13*b* operates when the average delivery pressure of the third and fourth delivery ports P3 and P4 exceeds Pa. With the increase in the average delivery pressure, the second torque control unit 13*b* executes the limiting control so as to decrease the maximum tilting angle of the second pump device 1*b* along the characteristic lines TP3 and TP4 of the two springs S3 and S4 (represented by one spring in FIG. 1 for simplicity of illustration). By decreasing the maximum tilting angle as above, the second torque control unit 13*b* carries out the constant absorption torque control (or the constant power control).

Incidentally, the setup torque of the characteristic lines TP1 and TP2 and the setup torque of the characteristic lines TP3 and TP4 have been set to be lower than ½ of the output torque TEL of the engine 2. The first torque control unit 13*a* performs the limiting control of the swash plate tilting angle (displacement) of the first pump device 1*a* so that the absorption torque of the first pump device 1*a* does not exceed a prescribed value (½ of TEL). The second torque control unit 13*b* performs the limiting control of the swash plate tilting angle (displacement) of the second pump device 1*b* so that the absorption torque of the second pump device 1*b* does not exceed the prescribed value (½ of TEL). Accordingly, even when an actuator related to the first pump device 1*a* and an actuator related to the second pump device 1*b* are driven at the same time, the total absorption torque of the first pump device 1*a* and the second pump device 1*b* remains within the output torque TEL of the engine 2, by which the engine stall is prevented.

Returning to FIG. 1, each pressure compensating valve 7*a*-7*m* is configured to set the differential pressure between the pump delivery pressure and the maximum load pressure as a target compensation differential pressure. Specifically, the delivery pressure of the first delivery port P1 is led to the opening-direction actuation side of the pressure compensating valves 7*a*-7*c*, while the maximum load pressure of the actuators 3*a*-3*e* detected by the first shuttle valve set 8*a* is led to the closing-direction actuation side of the pressure compensating valves 7*a*-7*c*. Each pressure compensating valve 7*a*-7*c* performs control so that the differential pressure across the meter-in throttling portion of the corresponding flow control valve 6*a*-6*c* becomes equal to the differential pressure between the delivery pressure and the maximum load pressure. The delivery pressure of the second delivery port P2 is led to the opening-direction actuation side of the pressure compensating valves 7*d*-7*f*, while the maximum load pressure of the actuators 3*a*-3*e* detected by the first shuttle valve set 8*a* is led to the closing-direction actuation side of the pressure compensating valves 7*d*-7*f*. Each pressure compensating valve 7*d*-7*f* performs control so that the differential pressure across the meter-in throttling portion of the corresponding flow control valve 6*d*-6*f* becomes equal to the differential pressure between the delivery pressure and the maximum load pressure. The delivery pressure of the third delivery port P3 is led to the opening-direction actuation side of the pressure compensating valves 7*g*-7*i*, while the maximum load pressure of the actuators 3*d*-3*h* detected by the second shuttle valve set 8*b* is led to the closing-direction actuation side of the pressure compensating valves 7*g*-7*i*. Each pressure compensating valve 7*g*-7*i* performs control so that the differential pressure across the meter-in throttling portion of the corresponding flow control valve 6*g*-6*i* becomes equal to the differential pressure between the delivery pressure and the maximum load pressure. The delivery pressure of the fourth delivery port P4 is led to the opening-direction actuation side of the pressure compensating valves 7*j*-7*m*, while the maximum load pressure of the actuators 3*d*-3*h* detected by the second shuttle valve set 8*b* is led to the closing-direction actuation side of the pressure compensating valves 7*j*-7*m*. Each pressure compensating valve 7*j*-7*m* performs control so that the differential pressure across the meter-in throttling portion of the corresponding flow control valve 6*j*-6*m* becomes equal to the differential pressure between the delivery pressure and the maximum load pressure. Accordingly, in each of the first and second pump devices 1*a* and 1*b*, in the combined operation in which two or more actuators are driven at the same time, appropriate flow rate distribution according to the opening area ratio among the flow control valves becomes possible irrespective of the magnitude of the load pressure of each actuator. Further, even in the saturation state in which the delivery flow rate of the first through fourth delivery ports P1-P4 is insufficient, it is possible to secure excellent operability by decreasing the differential pressure across the meter-in throttling portion of each flow control valve according to the degree of the saturation.

The actuators 3*a*-3*h* are a boom cylinder, a swing cylinder, a bucket cylinder, left and right travel motors, a swing motor, a blade cylinder and an arm cylinder of the hydraulic excavator, respectively.

The boom cylinder 3*a* (first actuator) is connected to the first and second delivery ports P1 and P2 of the first pump device 1*a* via the flow control valves 6*a* and 6*e* and the pressure compensating valves 7*a* and 7*e* so that the hydraulic fluid delivered from the first delivery port P1 and the hydraulic fluid delivered from the second delivery port P2 are supplied to the boom cylinder 3*a* after merging together. The arm cylinder 3*h* (second actuator) is connected to the third and fourth delivery ports P3 and P4 of the second pump device 1*b* via the flow control valves 6*h* and 6*l* and the pressure compensating valves 7*h* and 7*l* so that the hydraulic fluid delivered from the third delivery port P3 and the hydraulic fluid delivered from the fourth delivery port P4 are supplied to the arm cylinder 3*h* after merging together.

The left travel motor 3*d* (third actuator) is connected to the second delivery port P2 (one of the first and second delivery ports P1 and P2 of the first pump device 1*a*) and the fourth delivery port P4 (one of the third and fourth delivery ports P3 and P4 of the second pump device 1*b*) via the flow control valves 6*f* and 6*j* and the pressure compensating valves 7*f* and 7*j* so that the hydraulic fluid delivered from the second delivery port P2 and the hydraulic fluid delivered from the fourth delivery port P4 are supplied to the left travel motor 3*d* after merging together. The right travel motor 3*e* (fourth actuator) is connected to the first delivery port P1 (the other of the first and second delivery ports P1 and P2 of the first pump device 1*a*) and the third delivery port P3 (the other of the third and fourth delivery ports P3 and P4 of the second pump device 1*b*) via the flow control valves 6*c* and 6*g* and the pressure compensating valves 7*c* and 7*g* so that the hydraulic fluid delivered from the first delivery port P1 and the hydraulic fluid delivered from the third delivery port P3 are merged and supplied to the right travel motor 3*e*.

The swing cylinder 3*b* is connected to the first delivery port P1 of the first pump device 1*a* via the flow control valve 6*b* and the pressure compensating valve 7*b* so that the hydraulic fluid delivered from the first delivery port P1 is supplied to the swing cylinder 3*b*. The bucket cylinder 3*c* is connected to the second delivery port P2 of the first pump device 1*a* via the flow control valve 6*d* and the pressure compensating valve 7*d* so that the hydraulic fluid delivered from the second delivery port P2 is supplied to the bucket cylinder 3*c*.

The swing motor 3*f* (second actuator) is connected to the third delivery port P3 of the second pump device 1*b* via the flow control valve 6*i* and the pressure compensating valve 7*i* so that the hydraulic fluid delivered from the third delivery port P3 is supplied to the swing motor 3*f*. The blade cylinder 3*g* is connected to the fourth delivery port P4 of the second pump device 1*b* via the flow control valve 6*k* and the pressure compensating valve 7*k* so that the hydraulic fluid delivered from the fourth delivery port P4 is supplied to the blade cylinder 3*g*.

The flow control valve 6*m* and the pressure compensating valve 7*m* are used as spares (accessory). For example, when a bucket 308 that has been attached to the hydraulic excavator is replaced with a crusher, an open/close cylinder of the crusher is connected to the fourth delivery port P4 via the flow control valve 6*m* and the pressure compensating valve 7*m*.

Figure 3:
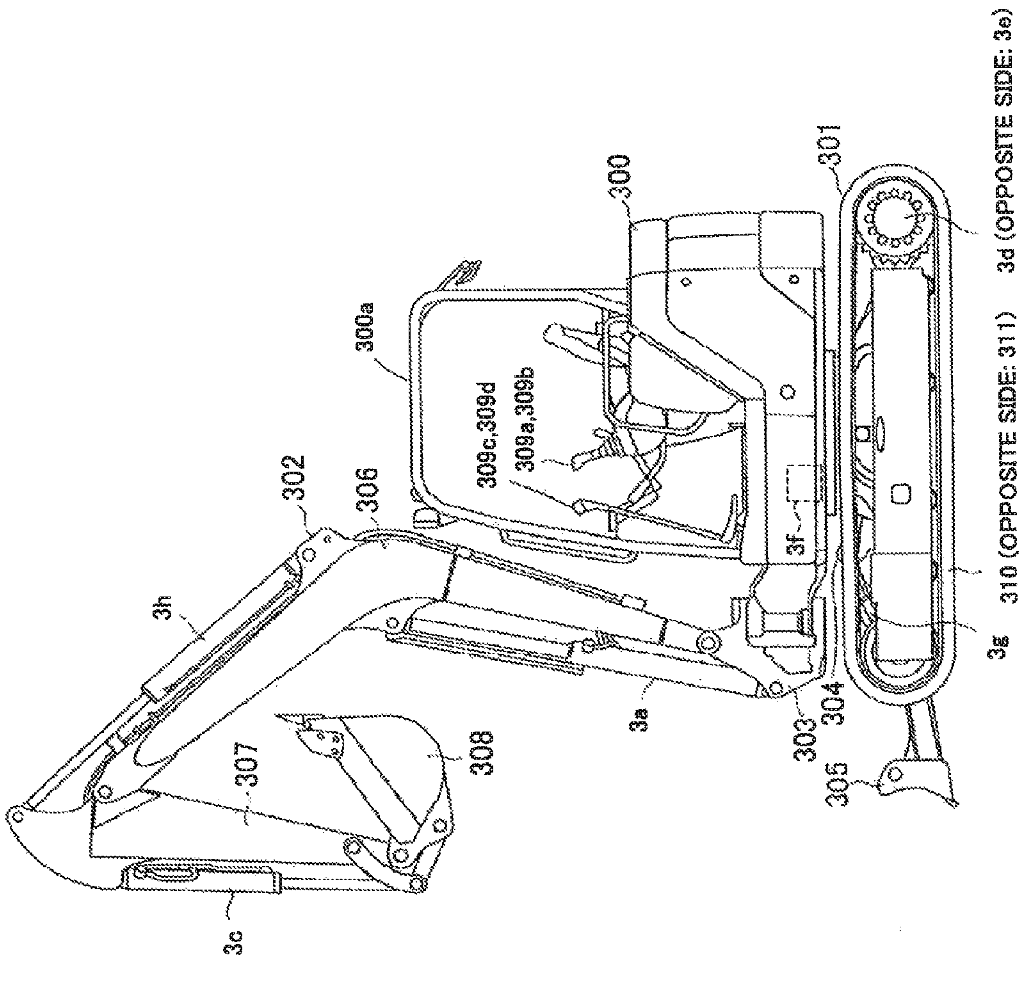
FIG. 3 is a schematic view showing the external appearance of the hydraulic excavator.

FIG. 3 shows the external appearance of the hydraulic excavator.

Referring to FIG. 3, the hydraulic excavator comprises an upper swing structure 300, a lower track structure 301, and a front work implement 302. The upper swing structure 300 is mounted on the lower track structure 301 to be rotatable. The front work implement 302 is connected to the front end part of the upper swing structure 300 via a swing post 303 to be rotatable vertically and horizontally. The lower track structure 301 is equipped with left and right crawlers 310 and 311, as well as a vertically movable earth-removing blade 305 attached to the front of a track frame 304. The upper swing structure 300 includes a cabin (operating room) 300*a*. Operating means such as control lever devices 309*a* and 309*b* for the front work implement and the swinging (only one is illustrated in FIG. 3) and control lever/pedal devices 309*c* and 309*d* for the traveling (only one is illustrated in FIG. 3) are arranged in the cabin 300*a*. The front work implement 302 is formed by connecting a boom 306, an arm 307 and a bucket 308 by using pins.

The upper swing structure 300 is driven and rotated with respect to the lower track structure 301 by the swing motor 3*f*. The front work implement 302 is rotated horizontally by rotating the swing post 303 with the swing cylinder 3*b* (see FIG. 1). The left and right crawlers 310 and 311 of the lower track structure 301 are driven and rotated by the left and right travel motors 3*d* and 3*e*. The blade 305 is driven vertically by the blade cylinder 3*g*. The boom 306, the arm 307 and the bucket 308 are vertically rotated by the expansion/contraction of the boom cylinder 3*a*, the arm cylinder 3*h* and the bucket cylinder 3*c*, respectively.

Operation

Next, the operation of this embodiment will be described below.

<Single Driving>

<<Single Driving of Actuator on First Pump Device 1*a*'s Side>>

When one of the actuators connected to the first pump device 1*a*'s side, e.g., boom cylinder 3*a*, is driven solely to perform the boom operation, the flow control valves 6*a* and 6*e* are switched over according to the operator's operation on the boom control lever and the hydraulic fluid delivered from the first delivery port P1 and the hydraulic fluid delivered from the second delivery port P2 are merged and supplied to the boom cylinder 3*a*. In this case, the delivery flow rates of the first and second delivery ports P1 and P2 are controlled by the load sensing control by the first load sensing control unit 12*a* and the constant absorption torque control by the first torque control unit 13*a* as explained above.

When the swing cylinder 3*b* or the bucket cylinder 3*c* is driven solely to perform the swing operation or the bucket operation, the flow control valve 6*b* or the flow control valve 6*d* is switched over according to the operator's operation on the swing control lever or the bucket control lever and the hydraulic fluid delivered from one of the first and second delivery ports P1 and P2 is supplied to the swing cylinder 3*b* or the bucket cylinder 3*c*. Also in this case, the delivery flow rates of the first and second delivery ports P1 and P2 are controlled by the load sensing control by the first load sensing control unit 12*a* and the constant absorption torque control by the first torque control unit 13*a*. The hydraulic fluid delivered from the delivery port P2 or P1 on the side not supplying the hydraulic fluid to the swing cylinder 3*b* or the bucket cylinder 3*c* is returned to the tank via the unload valve 10*b* or 10*a*.

<Single Driving of Actuator on Second Pump Device 1*b*'s Side>

When one of the actuators connected to the second pump device 1*b*'s side, e.g., arm cylinder 3*h*, is driven to perform the arm operation, the flow control valves 6*h* and 6*l* are switched over according to the operator's operation on the arm control lever and the hydraulic fluid delivered from the third delivery port P3 and the hydraulic fluid delivered from the fourth delivery port P4 are merged and supplied to the arm cylinder 3*h*. In this case, the delivery flow rates of the third and fourth delivery ports P3 and P4 are controlled by the load sensing control by the second load sensing control unit 12*b* and the constant absorption torque control by the second torque control unit 13*b* as explained above.

When the swing motor 3*f* or the blade cylinder 3*g* is driven solely to perform the swinging or the blade operation, the flow control valve 6*i* or the flow control valve 6*k* is switched over according to the operator's operation on the swing control lever or the blade control lever and the hydraulic fluid delivered from one of the third and fourth delivery ports P3 and P4 is supplied to the swing motor 3*f* or the blade cylinder 3*g*. Also in this case, the delivery flow rates of the third and fourth delivery ports P3 and P4 are controlled by the load sensing control by the second load sensing control unit 12*b* and the constant absorption torque control by the second torque control unit 13*b*. The hydraulic fluid delivered from the delivery port P4 or P3 on the side not supplying the hydraulic fluid to the swing motor 3*f* or the blade cylinder 3*g* is returned to the tank via the unload valve 10*d* or 10*c*.

<Simultaneous Driving of Actuator on First Pump Device 1*a*'s Side and Actuator on Second Pump Device 1*b*'s Side>

<<Simultaneous Driving of Boom Cylinder and Arm Cylinder>>

When the boom cylinder 3*a* and the arm cylinder 3*h* are driven at the same time to perform the combined operation of the boom 306 and the arm 307, the flow control valves 6*a* and 6*e* and the flow control valves 6*h* and 6*l* are switched over according to the operator's operation on the boom control lever and the arm control lever. In this case, the hydraulic fluid delivered from the first delivery port P1 and the hydraulic fluid delivered from the second delivery port P2 are merged and supplied to the boom cylinder 3*a*, while the hydraulic fluid delivered from the third delivery port P3 and the hydraulic fluid delivered from the fourth delivery port P4 are merged and supplied to the arm cylinder 3*h*. On the first pump device 1*a*'s side, the delivery flow rates of the first and second delivery ports P1 and P2 are controlled by the load sensing control by the first load sensing control unit 12*a* and the constant absorption torque control by the first torque control unit 13*a* as explained above. On the second pump device 1*b*'s side, the delivery flow rates of the third and fourth delivery ports P3 and P4 are controlled by the load sensing control by the second load sensing control unit 12*b* and the constant absorption torque control by the second torque control unit 13*b* as explained above.

<Simultaneous Driving of Boom Cylinder and Swing Motor>

When the boom cylinder 3*a* and the swing motor 3*f* are driven at the same time to perform the combined operation of the boom 306 and the upper swing structure 300 (swinging), the flow control valves 6*a* and 6*e* and the flow control valve 6*l* are switched over according to the operator's operation on the boom control lever and the swing control lever. In this case, the hydraulic fluid delivered from the first delivery port P1 and the hydraulic fluid delivered from the second delivery port P2 are merged and supplied to the boom cylinder 3*a*, while the hydraulic fluid delivered from the third delivery port P3 is supplied to the swing motor 3*f*. On the first pump device 1*a*'s side, the delivery flow rates of the first and second delivery ports P1 and P2 are controlled by the load sensing control by the first load sensing control unit 12*a* and the constant absorption torque control by the first torque control unit 13*a* as explained above. On the second pump device 1*b*'s side, the delivery flow rates of the third and fourth delivery ports P3 and P4 are controlled by the load sensing control by the second load sensing control unit 12*b* and the constant absorption torque control by the second torque control unit 13*b* as explained above. The hydraulic fluid delivered from the fourth delivery port P4 on the side where the flow control valves 6*i*-6*m* are closed is returned to the tank via the unload valve 10*d*.

<<Simultaneous Driving of Other Combinations of Actuator on First Pump Device 1*a*'s Side and Actuator on Second Pump Device 1*b*'s Side>>

Also in other combined operations in which at least one of the actuators connected only to the first and second delivery ports P1 and P2 of the first pump device 1*a* (boom cylinder 3*a*, swing cylinder 3*b*, bucket cylinder 3*c*) and at least one of the actuators connected only to the third and fourth delivery ports P3 and P4 of the second pump device 1*b* (swing motor 3*f*, blade cylinder 3*g*, arm cylinder 3*h*) are driven at the same time, the delivery flow rates of the first and second delivery ports P1 and P2 and the delivery flow rates of the third and fourth delivery ports P3 and P4 are controlled by the load sensing control and the constant absorption torque control and the hydraulic fluid delivered from the delivery port on the side where the flow control valves are closed is returned to the tank via the corresponding unload valve similarly to the above example.

<Simultaneous Driving of Two Actuators on First Pump Device 1*a*'s Side>

In a combined operation in which at least one of the actuators connected to the first delivery port P1 of the first pump device 1*a* (boom cylinder 3*a*, swing cylinder 3*b*, right travel motor 3*e*) and at least one of the actuators connected to the second delivery port P2 of the first pump device 1*a* (boom cylinder 3*a*, bucket cylinder 3*c*, left travel motor 3*d*) are driven at the same time, the delivery flow rates of the first and second delivery ports P1 are controlled by the load sensing control by the first load sensing control unit 12*a* and the constant absorption torque control (or the constant power control) by the first torque control unit 13*a* similarly to the case of the boom operation in which only the boom cylinder 3*a* is driven. In this case, when there is a difference in the demanded flow rate, the surplus hydraulic fluid flow from the delivery port on the low demanded flow rate side is returned to the tank via the unload valve.

Also in combined operations of actuators connected to the first delivery port P1 of the first pump device 1*a* (boom cylinder 3*a*, swing cylinder 3*b*, right travel motor 3*e*) and combined operations of actuators connected to the second delivery port P2 of the first pump device 1*a* (boom cylinder 3*a*, bucket cylinder 3*c*, left travel motor 3*d*), the delivery flow rates of the first and second delivery ports P1 are controlled by the load sensing control by the first load sensing control unit 12*a* and the constant absorption torque control (or the constant power control) by the first torque control unit 13*a* similarly to the case of the boom operation in which only the boom cylinder 3*a* is driven. In this case, the hydraulic fluid delivered from the delivery port on the side where the flow control valves are closed is returned to the tank via the corresponding unload valve.

<Simultaneous Driving of Two Actuators on Second Pump Device 1*b*'s Side>

Also in combined operations in which two actuators on the second pump device 1*b*'s side are driven at the same time, the delivery flow rates of the third and fourth delivery ports P3 and P4 are controlled by the load sensing control by the second load sensing control unit 12*b* and the constant absorption torque control (or the constant power control) by the second torque control unit 13*b* similarly to the aforementioned case of the combined operation in which two actuators on the first pump device 1*a*'s side are driven at the same time. The surplus hydraulic fluid flow from the delivery port on the low demanded flow rate side or the hydraulic fluid delivered from the delivery port on the side where the flow control valves are closed is returned to the tank via the unload valve.

<Traveling Operation>

When the left travel motor 3*d* and the right travel motor 3*e* is driven to perform the traveling operation, the flow control valves 6*f* and 6*j* and the flow control valves 6*c* and 6*g* are switched over according to the operator's operation on the left and right travel control levers/pedals. In this case, the hydraulic fluid delivered from the second delivery port P2 of the first pump device 1*a* and the hydraulic fluid delivered from the fourth delivery port P4 of the second pump device 1*b* are merged and supplied to the left travel motor 3*d*, while the hydraulic fluid delivered from the first delivery port P1 of the first pump device 1*a* and the hydraulic fluid delivered from the third delivery port P3 of the second pump device 1*b* are merged and supplied to the right travel motor 3*e*. On the first pump device 1*a*'s side, the delivery flow rates of the first and second delivery ports P1 and P2 are controlled by the load sensing control by the first load sensing control unit 12*a* and the constant absorption torque control by the first torque control unit 13*a* as explained above. On the second pump device 1*b*'s side, the delivery flow rates of the third and fourth delivery ports P3 and P4 are controlled by the load sensing control by the second load sensing control unit 12*b* and the constant absorption torque control by the second torque control unit 13*b* as explained above.

<<Straight Traveling Operation>>

When straight traveling is performed in the traveling operation, the operator operates the left and right travel control levers/pedals by the same amount. Accordingly, the flow control valves 6*f* and 6*j* and the flow control valves 6*c* and 6*g* are switched over so that the stroke amount (opening area) of the flow control valve 6*f*/6*j* equals the stroke amount (opening area) of the flow control valve 6*c*/6*g*, by which the demanded flow rate of the flow control valves 6*f* and 6*j* and that of the flow control valves 6*c* and 6*g* become equal to each other. In this case, the hydraulic fluid delivered from the second delivery port P2 of the first pump device 1*a* and the hydraulic fluid delivered from the fourth delivery port P4 of the second pump device 1*b* are merged and supplied to the left travel motor 3*d*, while the hydraulic fluid delivered from the first delivery port P1 of the first pump device 1*a* and the hydraulic fluid delivered from the third delivery port P3 of the second pump device 1*b* are merged and supplied to the right travel motor 3*e*. Therefore, even when the load pressure of one of the left and right travel motors becomes high for the reasons such that one of the left and right crawlers 310 and 311 has run on an obstacle, the supply flow rate of the left travel motor 3*d* and that of the right travel motor 3*e* become equal to each other and the vehicle is allowed to travel straight without meandering (details will be explained later).

Figure 4:
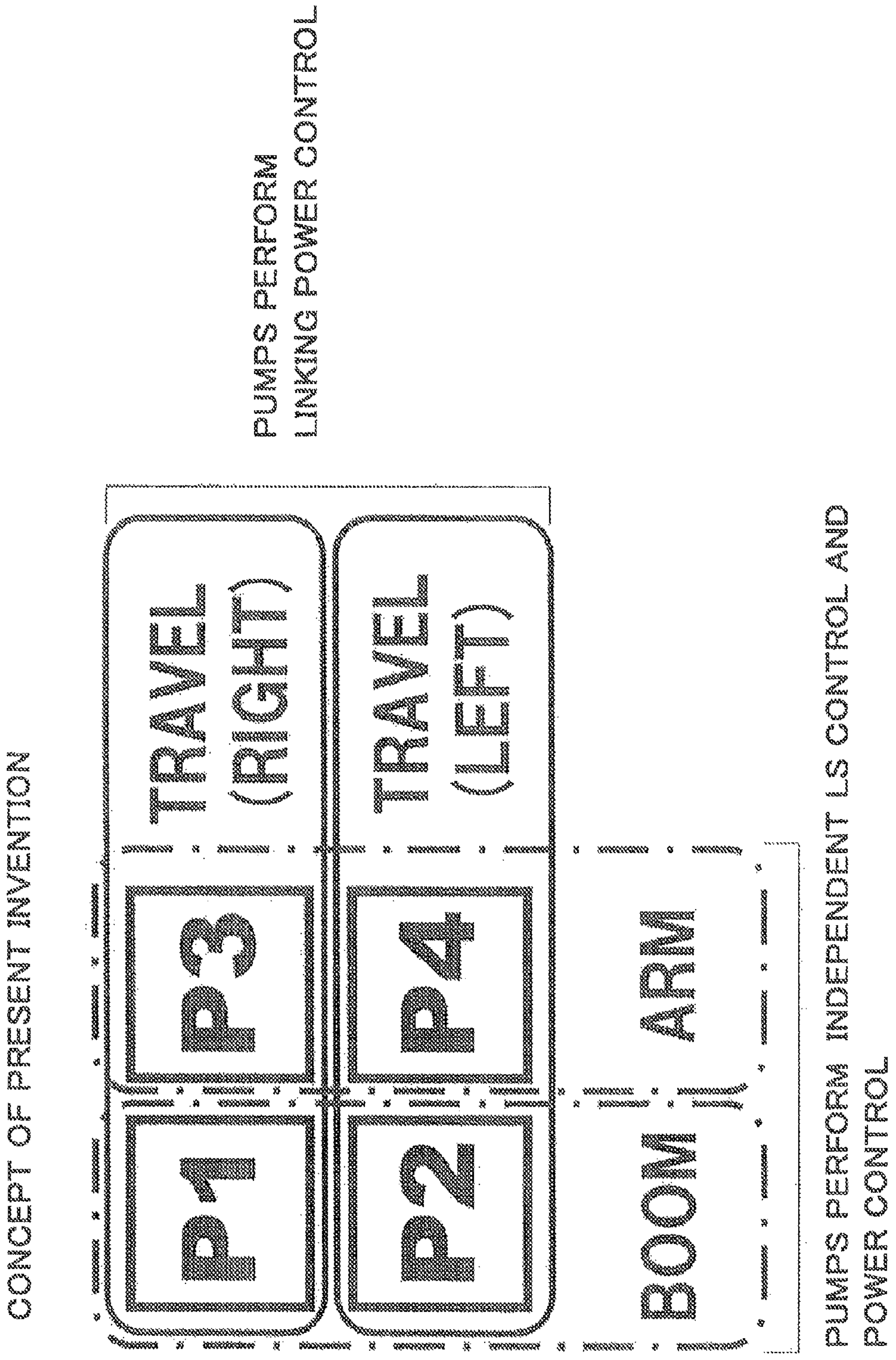
FIG. 4 is a schematic view summarizing the inventive concept of the first embodiment.

FIG. 4 is a schematic view summarizing the inventive concept of this embodiment which has been described above. As shown in FIG. 4, in this embodiment, for the combined operation of the boom and the arm, each of the first and second pump devices 1*a* and 1*b* performs independent load sensing control and constant absorption torque control (power control). For the traveling operation, the first and second pump devices 1*a* and 1*b* perform linking constant absorption torque control (power control).

Effect

Next, effects achieved by this embodiment will be explained below.

1. Combined Operation of Boom and Arm

Combined operation for the leveling is an example of the combined operation of the boom 306 and the arm 307. In the leveling combined operation, the arm cylinder 3*h* is controlled at a high flow rate, while the boom cylinder 3*a* is controlled at a low flow rate. In other words, in the leveling combined operation, the boom 306 and the arm 307 operate as the first and second actuators that are driven at the same time while producing a relatively large supply flow rate difference therebetween.

In hydraulic drive systems equipped with a conventional load sensing system employing one split flow type hydraulic pump having two delivery ports and separately connecting the boom cylinder and the arm cylinder to the two delivery ports, when the leveling operation is performed, a the demanded flow rate on the high flow rate actuator's side (arm cylinder's side) is given high priority in the load sensing control and the swash plate tilting angle of the pump device is controlled to increase the displacement. In this case, since the same swash plate is used for the two delivery ports in the split flow type hydraulic pump, the delivery port on the low flow rate actuator's side (boom cylinder's side) also delivers a high flow rate and that causes a surplus flow. The surplus flow is drained to the tank by the unload valve as part of the energy consumption by the pump device, causing energy loss.

In hydraulic drive systems equipped with a conventional load sensing system that merges the delivery flows of two delivery ports of a split flow type hydraulic pump and drives the boom cylinder and the arm cylinder by use of the merged delivery flow, the delivery flow rates of the hydraulic pump are controlled without causing the surplus flow when the leveling operation is performed. However, in the leveling combined operation which is performed by using the boom and the arm, the boom cylinder operates as the high load pressure side and the arm cylinder operates as the low load pressure side, and the delivery pressures of the hydraulic pump are controlled to be higher than the high load pressure of the boom cylinder by a certain preset pressure. In this case, the pressure compensating valve provided for driving the arm cylinder and preventing excessive flow to the low load pressure arm cylinder is throttled. Thus, energy loss is caused by the pressure loss at the pressure compensating valve.

In contrast to such conventional systems, the system of this embodiment employs two split flow type hydraulic pumps each having two delivery ports. The boom cylinder 3*a* is connected so that hydraulic fluids delivered from the two delivery ports (first and second delivery ports P1 and P2) of one (first pump device 1*a*) of the two hydraulic pumps (pump devices 1*a* and 1*b*) are merged and supplied to the boom cylinder 3*a*. The arm cylinder 3*h* is connected so that hydraulic fluids delivered from the two delivery ports (third and fourth delivery ports P3 and P4) of the other hydraulic pump (second pump device 1*b*) are merged and supplied to the arm cylinder 3*h*. With this configuration, in the simultaneous driving of the boom cylinder 3*a* and the arm cylinder 3*h*, the load sensing control and the constant absorption torque control are performed on the first pump device 1*a*'s side and on the second pump device 1*b*'s side independently of each other. Consequently, in combined operations in which the two actuators need a high flow rate and a low flow rate, respectively, as in the leveling combined operation, each of the first and second pump devices 1*a* and 1*b* delivers only the necessary flow rates, no surplus flow is caused, and flow rate control with no energy loss becomes possible. Further, since the delivery pressures of the second pump device 1*b* on the arm cylinder 3*h*'s side (low load pressure side) are controlled to be higher than the load pressure of the arm cylinder 3*h* by a certain preset pressure, energy loss caused by the pressure loss at the pressure compensating valves 7*h* and 7*l* of the arm cylinder 3*h* can also be reduced.

2. Straight Traveling Operation

By employing two split flow type hydraulic pumps each having two delivery ports and connecting the boom cylinder 3*a* and the arm cylinder 3*h* respectively to the two hydraulic pumps (pump devices 1*a* and 1*b*) so that the hydraulic fluids delivered from the two delivery ports are merged and supplied to each actuator of the boom cylinder 3*a* and arm cylinder 3*h*, even in combined operations in which a flow rate difference occurs between the two actuators as in the leveling operation, no surplus flow is caused and flow rate control with no energy loss becomes possible as explained above. However, it is necessary to add an idea to the connection of the actuators to the two hydraulic pumps in cases where such a hydraulic system employing two split flow type hydraulic pumps is used for driving two actuators such as the left and right travel motors that achieve a prescribed function (e.g., straight traveling function) by their supply flow rates becoming equivalent to each other.

Figure 5:
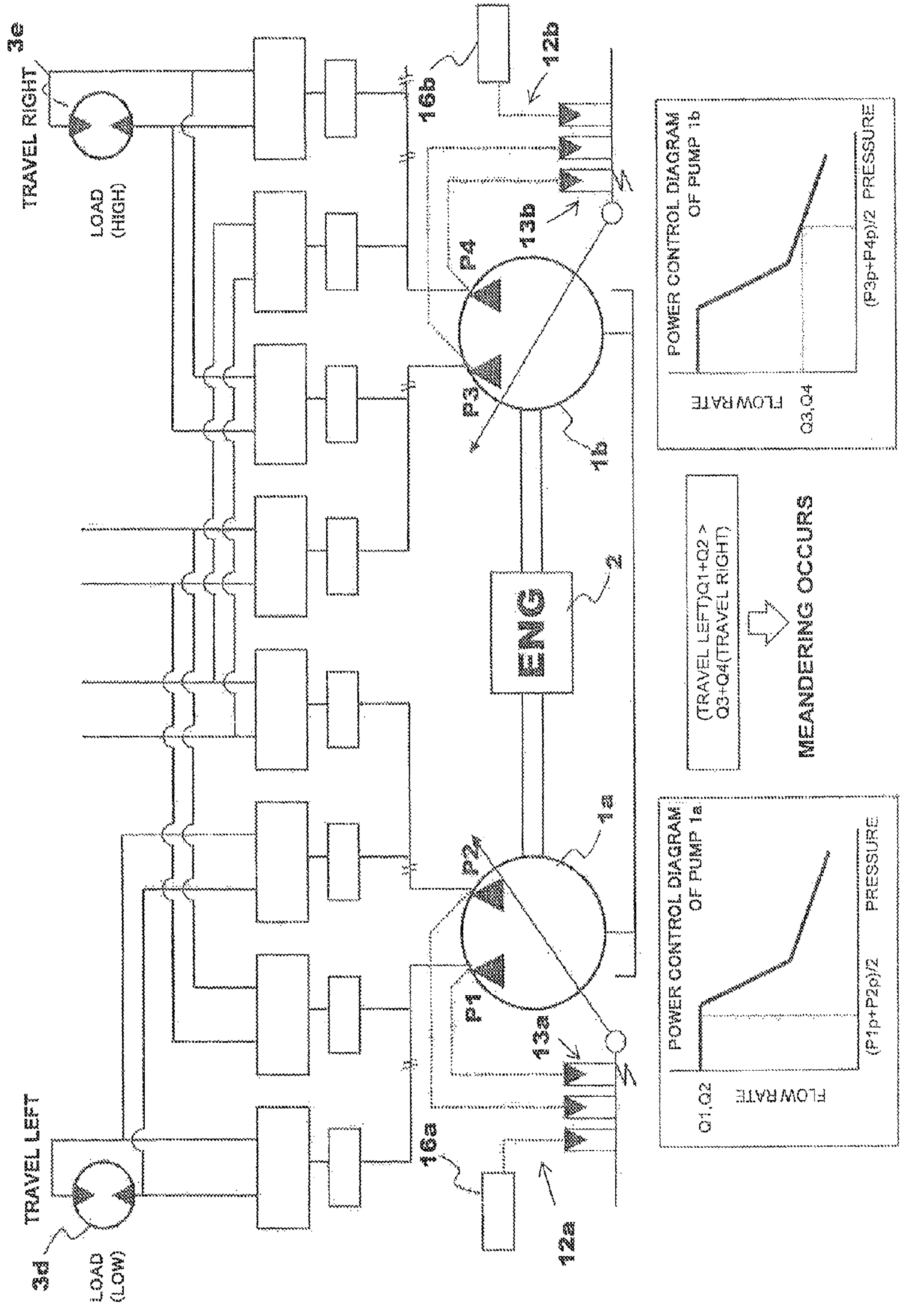
FIG. 5 is a schematic view showing a comparative example.

FIG. 5 is a schematic view showing a comparative example. In this comparative example employing two split flow type hydraulic pumps, the left travel motor 3*d* is connected to the first and second delivery ports P1 and P2 of the first pump device 1*a*, while the right travel motor 3*e* is connected to the third and fourth delivery ports P3 and P4 of the second pump device 1*b*. The first pump controller 5*a* and the second pump controller 5*b* are configured in the same way as in the system of this embodiment. Power control diagrams of the first and second pump devices 1*a* and 1*b* are shown at the bottom.

In the configuration shown in FIG. 5, when the load pressure of one of the left and right travel motors becomes high for the reasons such that one of the left and right crawlers has run on an obstacle, the delivery flow rates of the first and second delivery ports P1 and P2 are controlled by the constant absorption torque control of the first and second torque control units 13*a* and 13*b* as shown in the power control diagrams below the first and second pump controllers 5*a* and 5*b* in FIG. 5. Specifically, when the load pressure of the left travel motor 3*d* is low and the load pressure of the right travel motor 3*e* is high, on the first pump device 1*a*'s side, the first torque control unit 13*a* does not operate, the swash plate tilting angle does not undergo the limitation by the constant absorption torque control, and the delivery flow rates of the first and second delivery ports P1 and P2 do not decrease. On the second pump device 1*b*'s side, the swash plate tilting angle is decreased by the constant absorption torque control by the second torque control unit 13*b* and the delivery flow rates of the third and fourth delivery ports P3 and P4 decrease. Consequently, assuming that the delivery flow rates of the first through fourth delivery ports P1-P4 are Q1-Q4, the delivery flow Q1+Q2 supplied to the left travel motor 3*d* and the delivery flow Q3+Q4 supplied to the right travel motor 3*e* satisfy the relationship Q1+Q2>Q3+Q4. In this case, the supply flow to the right travel motor 3*e* drops in spite of the straight traveling operation, causing the meandering of the vehicle.

Figure 6:
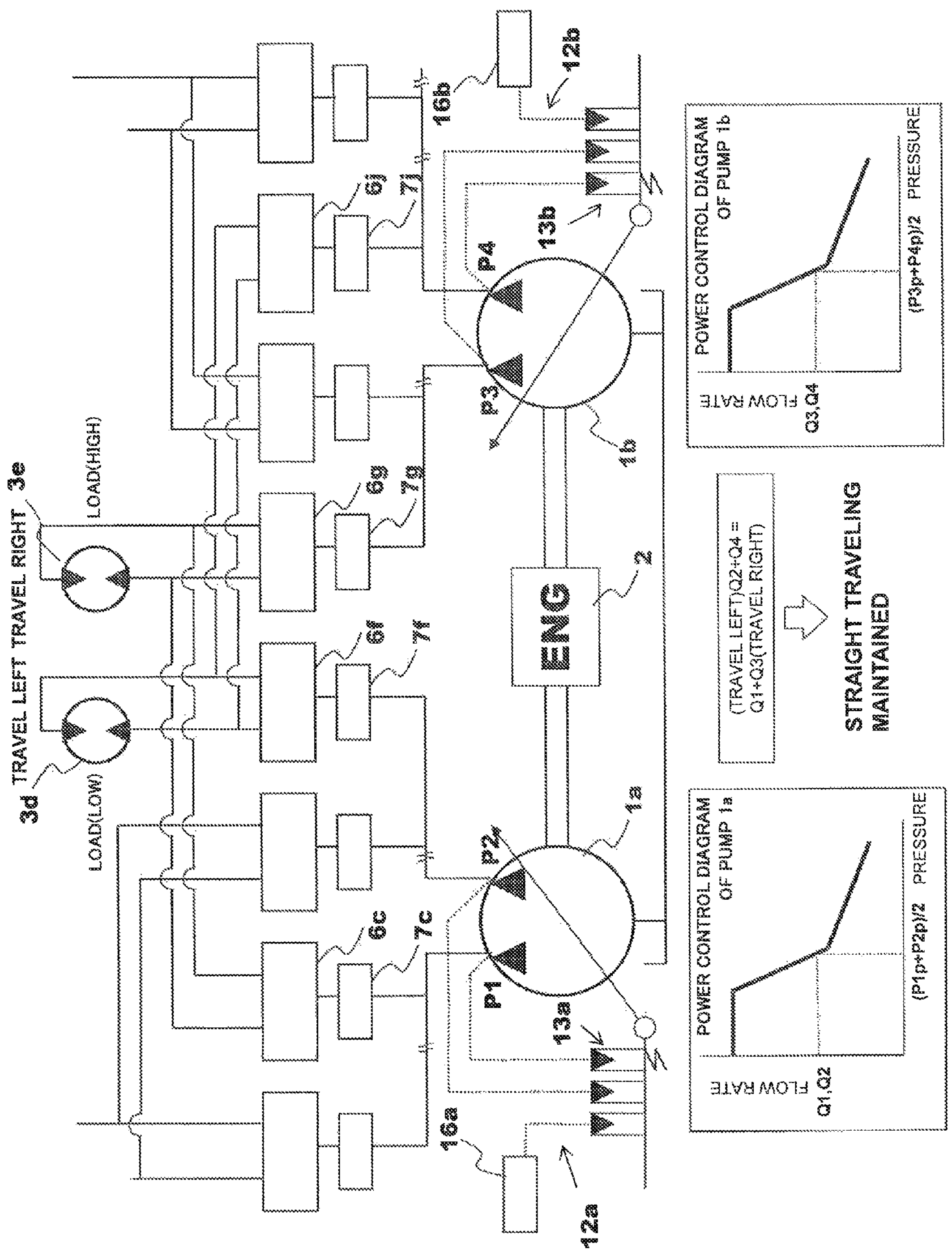
FIG. 6 is a schematic view showing circuitry in the first embodiment in contrast with the comparative example of FIG. 5.

FIG. 6 is a schematic view showing the circuitry in this embodiment in contrast with the comparative example of FIG. 5. Power control diagrams of the first and second pump devices are shown below the pump devices.

In this embodiment, the travel motors 3*d* and 3*e* are connected to the first through fourth delivery ports P1-P4 so that the hydraulic fluid delivered from the second delivery port P2 of the first pump device 1*a* and the hydraulic fluid delivered from the fourth delivery port P4 of the second pump device 1*b* are merged and supplied to the left travel motor 3*d* and the hydraulic fluid delivered from the first delivery port P1 of the first pump device 1*a* and the hydraulic fluid delivered from the third delivery port P3 of the second pump device 1*b* are merged and supplied to the right travel motor 3*e*. Therefore, the average delivery pressure of the first and second delivery ports P1 and P2 and that of the third and fourth delivery ports P3 and P4 are equal to each other. Specifically, assuming that the delivery pressures of the first through fourth delivery ports P1-P4 are P1*p*-P4*p*, the average delivery pressure of the first and second delivery ports P1 and P2 can be expressed as (P1*p*+P2*p*)/2 and that of the third and fourth delivery ports P3 and P4 can be expressed as (P3*p*+P4*p*)/2. Since the conditions P1*p*=P3*p* and P2*p*=P4*p* hold, the following relationship is satisfied:

$$(P1p+P2p)/2=(P3p+P4p)/2$$

Therefore, even when the load pressure of one of the left and right travel motors becomes high for the reasons such that one of the left and right crawlers has run on an obstacle, the load pressure is controlled by both the first torque control unit 13*a* of the first pump controller 5*a* and the second torque control unit 13*b* of the second pump controller 5*b* and the relationship (P1*p*+P2*p*)/2=(P3*p*+P4*p*)/2 is maintained. Consequently, even if the swash plate tilting angles of the first and second pump devices 1*a* and 1*b* are decreased by the constant absorption torque control by the first and second torque control units 13*a* and 13*b* and the delivery flow rates of the first and second delivery ports P1 and P2 and those of the third and fourth delivery ports P3 and P4 decreased, the tilting angles (delivery flow rates) of the first and second pump devices 1*a* and 1*b* are kept equal to each other as shown in FIG. 6, by which the vehicle is allowed to travel straight without meandering.

Further, since the travel motors 3*d* and 3*e* in this embodiment are connected to the first through fourth delivery ports P1-P4 so that the hydraulic fluid delivered from the second delivery port P2 of the first pump device 1*a* and the hydraulic fluid delivered from the fourth delivery port P4 of the second pump device 1*b* are merged and supplied to the left travel motor 3*d* and the hydraulic fluid delivered from the first delivery port P1 of the first pump device 1*a* and the hydraulic fluid delivered from the third delivery port P3 of the second pump device 1*b* are merged and supplied to the right travel motor 3*e*, the supply flow rate of the left travel motor 3*d* and that of the right travel motor 3*e* remain equal to each other even supposing the swash plate tilting angles of the first and second pump devices 1*a* and 1*b* has become different from each other and a delivery flow rate difference has occurred between the first and second delivery ports P1 and P2 and the third and fourth delivery ports P3 and P4. Consequently, the vehicle is allowed to travel straight without meandering.

Specifically, assuming that the delivery flow rates of the first through fourth delivery ports P1-P4 are Q1-Q4 similarly to the case of FIG. 5, the supply flow rate to the left travel motor 3*d* and that to the right travel motor 3*e* are expressed as follows:

$$\text{left travel supply flow rate: } Q2+Q4$$

$$\text{right travel supply flow rate: } Q1+Q3$$

where relationships Q1=Q2 (due to the use of the same swash plate) and Q3=Q4 (due to the use of the same swash plate) hold. Thus, even supposing Q1=Q2≠Q3=Q4, the following relationship is satisfied and the supply flow rates of the left and right travel motors 3*d* and 3*e* become equal to each other:

$$Q2+Q4=Q1+Q3$$

As above, even when a delivery flow rate difference occurred between the first and second delivery ports P1 and P2 and the third and fourth delivery ports P3 and P4, the supply flow rates of the left and right travel motors 3*d* and 3*e* become equal to each other and the vehicle is allowed to travel straight without meandering.

Incidentally, such cases where a delivery flow rate difference occurs between the first and second delivery ports P1 and P2 and the third and fourth delivery ports P3 and P4 even when the average delivery pressure of the first and second delivery ports P1 and P2 and that of the third and fourth delivery ports P3 and P4 are equal to each other and the constant absorption torque control is ON include a case where a difference in the displacement occurs between the first and second pump devices 1*a* and 1*b* due to manufacturing errors or secular change, a case where a difference in the delivery flow rate occurs due to a difference in transient responsiveness, and so forth.

While the displacements of the first and second pump devices 1*a* and 1*b* are set equal to each other in this embodiment, the displacements of the pump devices 1*a* and 1*b* may also be intentionally designed to be different from each other. Even with such a design, the vehicle is allowed to travel straight since the aforementioned relationship Q2+Q4=Q1+Q3 is maintained. Optimum design of the first and second pump devices 1*a* and 1*b* becomes possible by setting the displacements of the first and second pump devices to be different from each other based on the maximum demanded flow rate on the first pump device 1*a*'s side and that on the second pump device 1*b*'s side.

Second Embodiment

Figure 7:
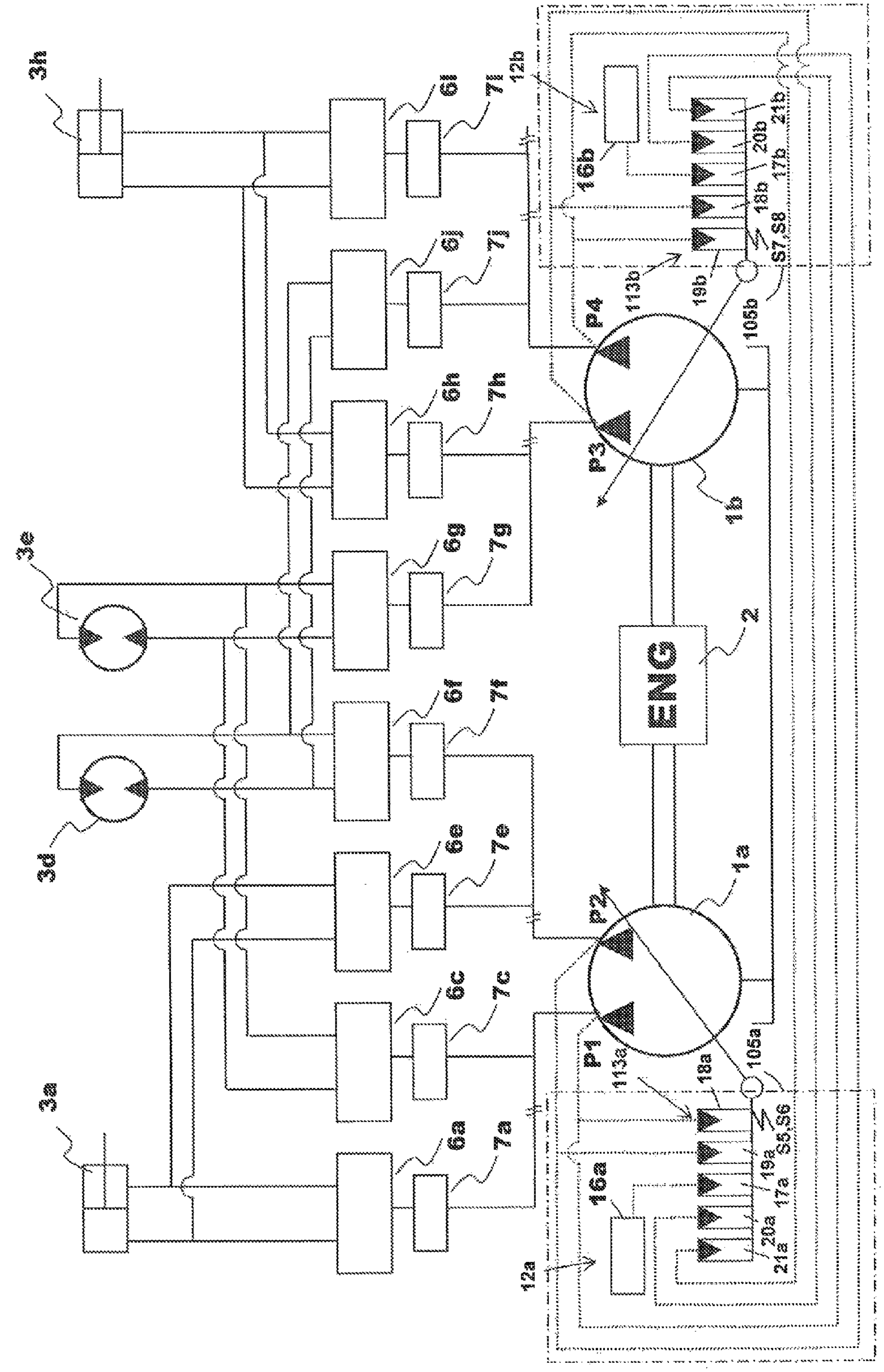
FIG. 7 is a schematic view showing a hydraulic drive system for a hydraulic excavator (construction machine) in accordance with a second embodiment of the present invention.

FIG. 7 is a schematic view showing a hydraulic drive system for a hydraulic excavator (construction machine) in accordance with a second embodiment of the present invention, wherein part of the circuit elements are unshown for the simplicity of illustration. In this embodiment, total power control is performed by feeding back the delivery pressures of all the ports to the first and second pump torque control units of the first and second pump devices.

Referring to FIG. 6, a first torque control unit 113*a* of a first pump controller 105*a* in this embodiment includes not only the first and second torque control pistons 18*a* and 19*a* to which the delivery pressures of the first and second delivery ports P1 and P2 of the first hydraulic pump device 1*a* related to itself are led, but also fifth and sixth torque control pistons 20*a* and 21*a* to which the delivery pressures of the third and fourth delivery ports P3 and P4 of the second hydraulic pump device 1*b* are led. When the average delivery pressure (P1*p*+P2*p*+P3*p*+P4*p*)/4 of the first and second delivery ports P1 and P2 of the first pump device 1*a* and the third and fourth delivery ports P3 and P4 of the second hydraulic pump device 1*b* exceeds a prescribed pressure P1, the first torque control unit 113*a* performs control so as to decrease the swash plate tilting angle of the first pump device 1*a* with the increase in the average delivery pressure. By this control, the swash plate tilting angle (displacement) of the first hydraulic pump device 1*a* is controlled so that the total absorption torque of the first and second hydraulic pump devices 1*a* and 1*b* does not exceed a prescribed value.

Similarly, a second torque control unit 113*b* of a second pump controller 105*b* includes not only the third and fourth torque control pistons 18*b* and 19*b* to which the delivery pressures of the third and fourth delivery ports P3, P4 of the second pump device 1*b* related to itself is led, but also seventh and eighth torque control pistons 20*b* and 21*b* to which the delivery pressures of the first and second delivery ports P1 and P2 of the first hydraulic pump device 1*a* are led. When the average delivery pressure (P1*p*+P2*p*+P3*p*+P4*p*)/4 of the first and second delivery ports P1 and P2 of the first pump device 1*a* and the third and fourth delivery ports P3 and P4 of the second hydraulic pump device 1*b* exceeds the prescribed pressure P1, the second torque control unit 113*b* performs control so as to decrease the swash plate tilting angle of the second pump device 1*b* with the increase in the average delivery pressure. By this control, the swash plate tilting angle (displacement) of the second hydraulic pump device 1*b* is controlled so that the total absorption torque of the first and second hydraulic pump devices 1*a* and 1*b* does not exceed a prescribed value.

Figure 8B:
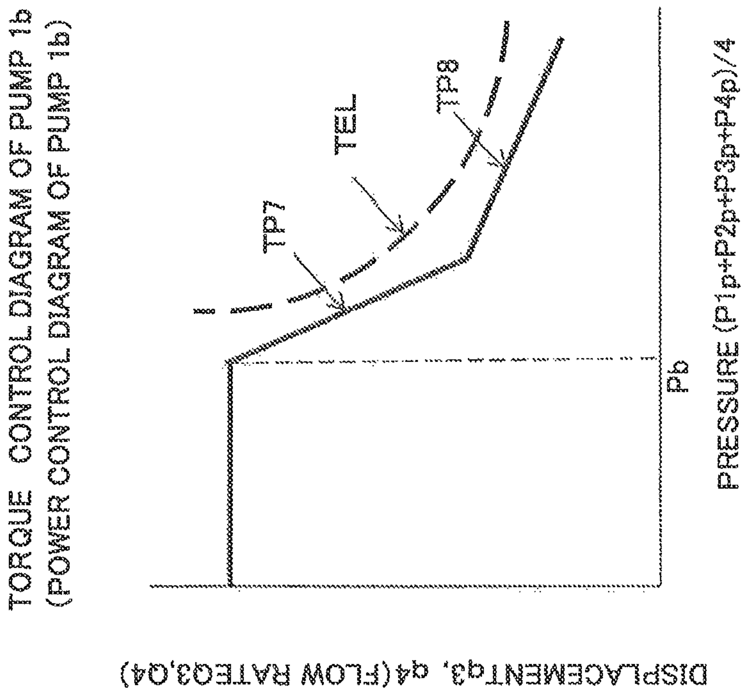
FIG. 8B is a torque control diagram of a second torque control unit of a second pump device in the second embodiment of the present invention.
Figure 8A:
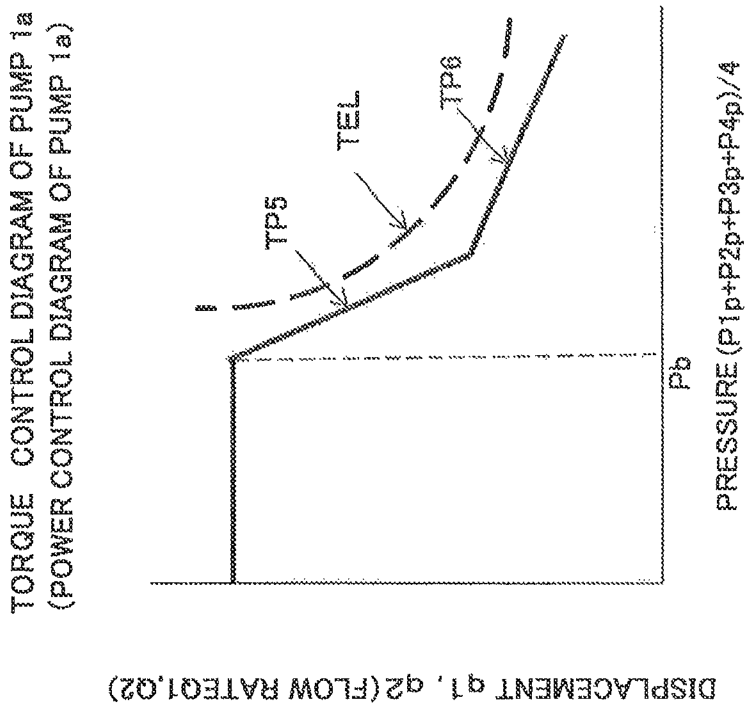
FIG. 8A is a torque control diagram of a first torque control unit of a first pump device in the second embodiment of the present invention.

FIG. 8A is a torque control diagram of the first torque control unit 113*a*. FIG. 8B is a torque control diagram of the second torque control unit 113*b*. In each torque control diagram, the vertical axis represents the tilting angle (displacement) q. If the vertical axis is replaced with the delivery flow rate, these diagrams become power control diagrams.

In FIG. 8A, the characteristic lines TP5 and TP6 have been set by two springs S5 and S6 (represented by one spring in FIG. 7 for simplicity of illustration) to approximate a constant absorption torque curve (hyperbolic curve). The setup torque of the characteristic lines TP5 and TP6 is substantially constant. Accordingly, the first torque control unit 113*a* executes the constant absorption torque control (or the constant power control) by decreasing the maximum tilting angle of the first pump device 1*a* along the characteristic lines TP5 and TP6 with the increase in the average delivery pressure (P1*p*+P2*p*+P3*p*+P4*p*)/4.

In FIG. 8B, the characteristic lines TP7 and TP8 have been set by two springs S7 and S8 (represented by one spring in FIG. 7 for simplicity of illustration) to approximate a constant absorption torque curve (hyperbolic curve). The setup torque of the characteristic lines TP7 and TP8 is substantially constant. Accordingly, the second torque control unit 113*b* executes the constant absorption torque control (or the constant power control) by decreasing the maximum tilting angle of the second pump device 1*b* along the characteristic lines TP7 and TP8 with the increase in the average delivery pressure (P1*p*+P2*p*+P3*p*+P4*p*)/4.

Incidentally, the setup torque of the characteristic lines TP5 and TP6 has been set to be higher than the setup torque of the characteristic lines TP1 and TP2 shown in FIG. 2A and lower than the output torque TEL of the engine 2. The setup torque of the characteristic lines TP7 and TP8 has been set to be higher than the setup torque of the characteristic lines TP3 and TP4 shown in FIG. 2B and lower than the output torque TEL of the engine 2. The first torque control unit 113*a* performs the limiting control of the swash plate tilting angle (displacement) of the first pump device 1*a* so that the absorption torque of the first pump device 1*a* does not exceed a prescribed value (TEL). The second torque control unit 113*b* performs the limiting control of the swash plate tilting angle (displacement) of the second pump device 1*b* so that the absorption torque of the second pump device 1*b* does not exceed the prescribed value (TEL). Accordingly, when an actuator related to the first pump device 1*a* and an actuator related to the second pump device 1*b* are driven at the same time, the total absorption torque of the first and second pump devices 1*a* and 1*b* remains within the output torque TEL of the engine 2, by which the engine stall is prevented. Further, the output torque TEL of the engine 2 can be fully utilized while preventing the engine stall in cases where only actuators related to the first pump device

1*a* are driven and in cases where only actuators related to the second pump device 1*b* are driven.

Third Embodiment

Figure 9:
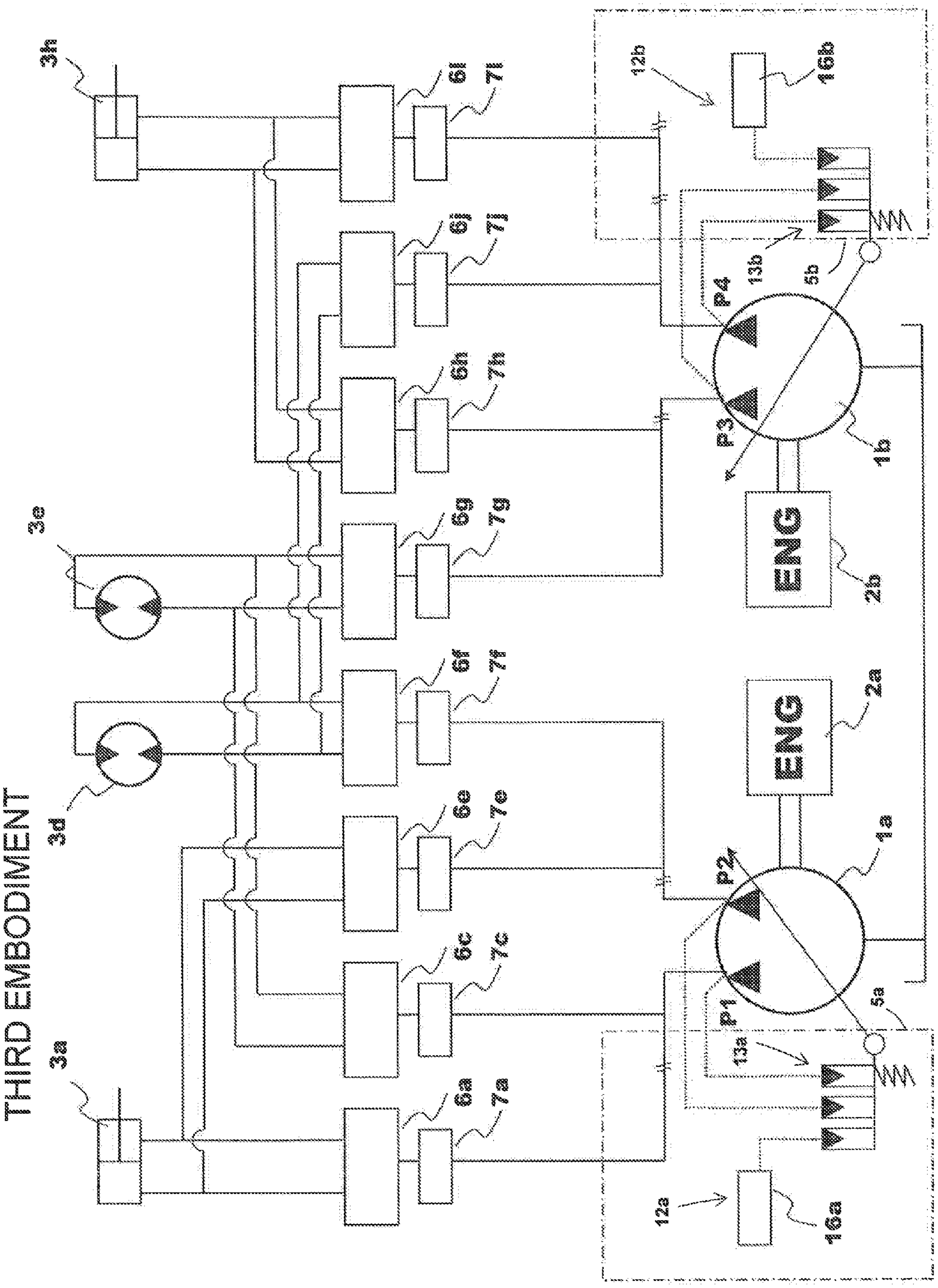
FIG. 9 is a schematic view showing a hydraulic drive system for a hydraulic excavator (construction machine) in accordance with a third embodiment of the present invention.

FIG. 9 is a schematic view showing a hydraulic drive system for a hydraulic excavator (construction machine) in accordance with a third embodiment of the present invention, wherein part of the circuit elements are unshown for the simplicity of illustration.

In this embodiment, the first and second pump devices 1*a* and 1*b* are provided with separate diesel engines 2*a* and 2*b* as the prime mover connected to the first and second pump devices 1*a* and 1*b* for driving them.

Also by this embodiment, effects similar to those of the first embodiment can be achieved.

Further, when an actuator related to the first pump device 1*a* and an actuator related to the second pump device 1*b* are driven at the same time, the total absorption torque of the first and second pump devices 1*a* and 1*b* remains within the output torque TEL of each engine 2*a*, 2*a*, by which the engine stall is prevented. Further, in each of the first and second pump devices 1*a* and 1*b*, the output torque TEL of each engine 2*a*, 2*a* can be fully utilized while preventing the engine stall.

Fourth Embodiment

Figure 10:
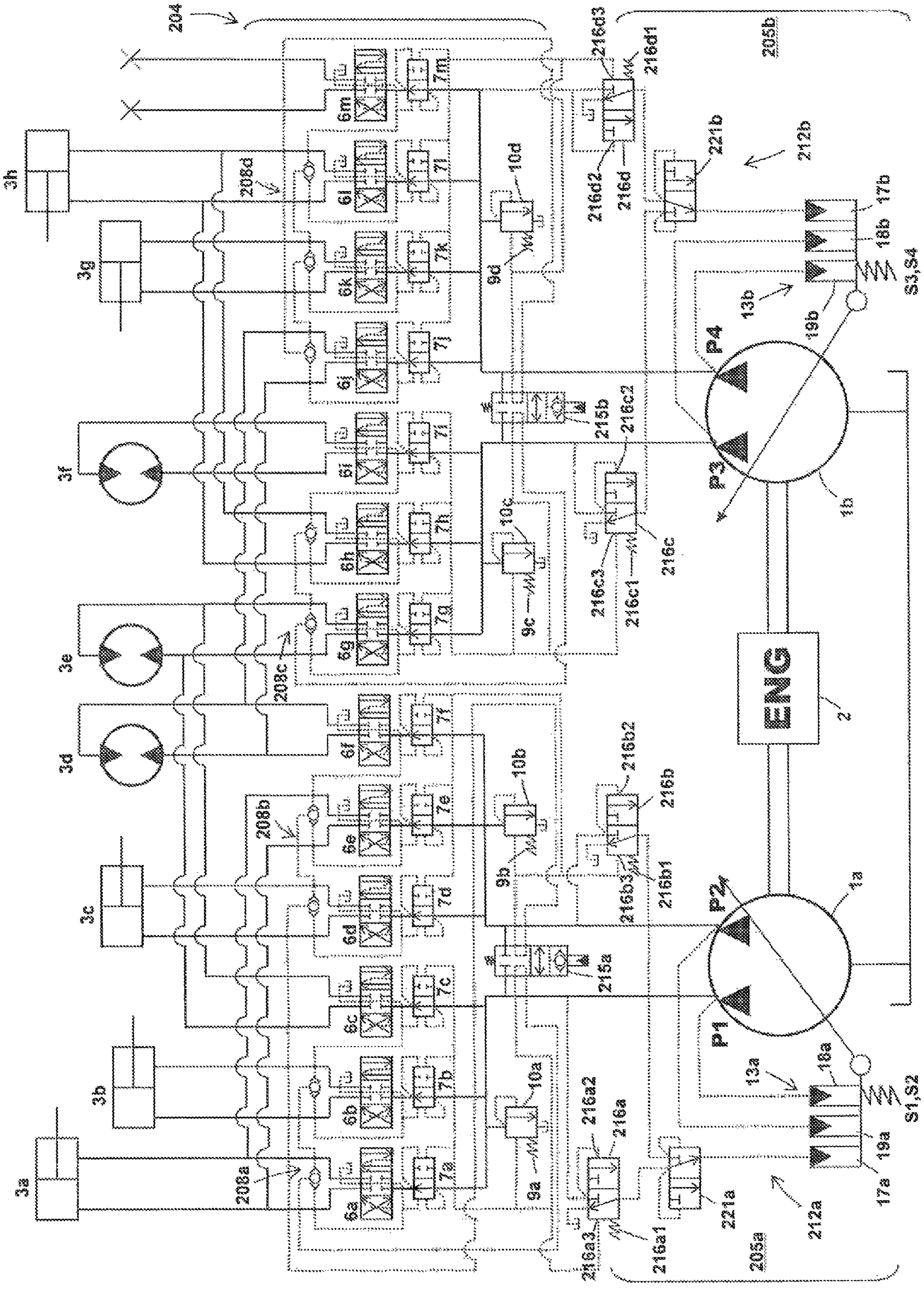
FIG. 10 is a schematic view showing a hydraulic drive system for a hydraulic excavator (construction machine) in accordance with a fourth embodiment of the present invention.

FIG. 10 is a schematic view showing a hydraulic drive system for a hydraulic excavator (construction machine) in accordance with a third embodiment of the present invention. This embodiment allows the vehicle to travel straight without meandering even in combined operation of the travel motors and another actuator.

Referring to FIG. 10, the hydraulic drive system in this embodiment comprises a control valve 204, a first pump controller 205*a*, and a second pump controller 205*b* instead of the control valve 4, the first pump controller 5*a*, and the second pump controller 5*b* in the first embodiment shown in FIG. 1.

The control valve 204 includes first through fourth shuttle valve sets 208*a*-208*d* instead of the first and second shuttle valve sets 8*a* and 8*b* in the first embodiment shown in FIG. 1. The first shuttle valve set 208*a* is connected to the load pressure ports of the flow control valves 6*a*-6*c* to detect the maximum load pressure of the actuators 3*a*, 3*b* and 3*e*. The second shuttle valve set 208*b* is connected to the load pressure ports of the flow control valves 6*d*-6*f* to detect the maximum load pressure of the actuators 3*a*, 3*c* and 3*d*. The third shuttle valve set 208*c* is connected to the load pressure ports of the flow control valves 6*g*-6*i* to detect the maximum load pressure of the actuators 3*e*, 3*f* and 3*h*. The fourth shuttle valve set 208*d* is connected to the load pressure ports of the flow control valves 6*j*-6*m* to detect the maximum load pressure of the actuators 3*d*, 3*g* and 3*h* and a spare actuator when the spare actuator has been connected to the flow control valve 6*m*.

The control valve 204 is not equipped with the shuttle valves 15*a* and 15*b* employed in the first embodiment shown in FIG. 1. Instead, the control valve 204 is equipped with a first travel communication valve 215*a* (communication valve) and a second travel communication valve 215*b* (communication valve). The first travel communication valve 215*a* is arranged between the delivery hydraulic lines of the first and second delivery ports P1 and P2 of the first pump device 1*a* and between the output hydraulic lines of the first and second shuttle valve sets 208*a* and 208*b*. The first travel communication valve 215*a* is set at an interrupting position (upper position in FIG. 10) at the time other than combined operation driving the travel motors 3*d* and 3*e* and at least one of other actuators related to the first pump device 1*a* (boom cylinder 3*a*, swing cylinder 3*b*, bucket cylinder 3*c*) at the same time (hereinafter referred to as "at the time other than the traveling combined operation"). The first travel communication valve 215*a* is switched to a communicating position (lower position in FIG. 10) at the time of the combined operation driving the travel motors 3*d* and 3*e* and at least one of the aforementioned other actuators at the same time (hereinafter referred to as "at the time of the traveling combined operation"). The second travel communication valve 215*b* is arranged between the delivery hydraulic lines of the third and fourth delivery ports P3 and P4 of the second pump device 1*b* and between the output hydraulic lines of the third and fourth shuttle valve sets 208*c* and 208*d*. The second travel communication valve 215*b* is set at an interrupting position (upper position in FIG. 10) at the time other than combined operation driving the travel motors 3*d* and 3*e* and at least one of other actuators related to the second pump device 1*b* (swing motor 3*f*, blade cylinder 3*g*, arm cylinder 3*h*) at the same time (hereinafter referred to as "at the time other than the traveling combined operation"). The second travel communication valve 215*b* is switched to a communicating position (lower position in FIG. 10) at the time of the combined operation driving the travel motors 3*d* and 3*e* and at least one of the aforementioned other actuators at the same time (hereinafter referred to as "at the time of the traveling combined operation").

At the interrupting position (upper position in FIG. 10), the first travel communication valve 215*a* interrupts the communication between the delivery hydraulic lines of the first and second delivery ports P1 and P2 of the first pump device 1*a*. When switched to the communicating position (lower position in FIG. 10), the first travel communication valve 215*a* brings the delivery hydraulic lines of the first and second delivery ports P1 and P2 of the first pump device 1*a* to communicate to each other.

Similarly, the second travel communication valve 215*b* at the interrupting position (upper position in FIG. 10) interrupts the communication between the delivery hydraulic lines of the third and fourth delivery ports P3 and P4 of the second pump device 1*b*. When switched to the communicating position (lower position in FIG. 10), the second travel communication valve 215*b* brings the delivery hydraulic lines of the third and fourth delivery ports P3 and P4 of the second pump device 1*b* to communicate to each other.

The first travel communication valve 215*a* includes a shuttle valve. At the interrupting position (upper position in FIG. 10), the first travel communication valve 215*a* interrupts the communication between the output hydraulic lines of the first and second shuttle valve sets 208*a* and 208*b* while communicating each of the output hydraulic lines to the downstream side. When switched to the communicating position (lower position in FIG. 10), the first travel communication valve 215*a* brings the output hydraulic lines of the first and second shuttle valve sets 208*a* and 208*b* to communicate to each other via the shuttle valve while leading out the maximum load pressure on the high pressure side to the downstream side of each of the output hydraulic lines.

Similarly, the second travel communication valve 215*b* includes a shuttle valve. At the interrupting position (upper position in FIG. 10), the second travel communication valve 215*b* interrupts the communication between the output hydraulic lines of the third and fourth shuttle valve sets 208*c* and 208*d* while communicating each of the output hydraulic lines to the downstream side. When switched to the communicating position (lower position in FIG. 10), the second travel communication valve 215*b* brings the output hydraulic lines of the third and fourth shuttle valve sets 208*c* and 208*d* to communicate to each other via the shuttle valve while leading out the maximum load pressure on the high pressure side to the downstream side of each of the output hydraulic lines.

When the first travel communication valve 215*a* is at the interrupting position (upper position in FIG. 10), on the first delivery port P1's side of the first pump device 1*a*, the maximum load pressure of the actuators 3*a*, 3*b* and 3*e* detected by the first shuttle valve set 208*a* is led to the first unload valve 10*a* and the pressure compensating valves 7*a*-7*c*. Based on the maximum load pressure, the first unload valve 10*a* limits the increase in the delivery pressure of the first delivery port P1 and each pressure compensating valve 7*a*-7*c* controls the differential pressure across the meter-in throttling portion of each flow control valve 6*a*-6*c*. On the second delivery port P2's side of the first pump device 1*a*, the maximum load pressure of the actuators 3*a*, 3*c* and 3*d* detected by the second shuttle valve set 208*b* is led to the second unload valve 10*b* and the pressure compensating valves 7*d*-7*f*. Based on the maximum load pressure, the second unload valve 10*b* limits the increase in the delivery pressure of the second delivery port P2 and each pressure compensating valve 7*d*-7*f* controls the differential pressure across the meter-in throttling portion of each flow control valve 6*d*-6*f*.

When the first travel communication valve 215*a* is switched to the communicating position (lower position in FIG. 10), on the first delivery port P1's side of the first pump device 1*a*, the maximum load pressure of the actuators 3*a*-3*e* detected by the first and second shuttle valve sets 208*a* and 208*b* is led to the first unload valve 10*a* and the pressure compensating valves 7*a*-7*c*. Based on the maximum load pressure, the first unload valve 10*a* limits the increase in the delivery pressure of the first delivery port P1 and each pressure compensating valve 7*a*-7*c* controls the differential pressure across the meter-in throttling portion of each flow control valve 6*a*-6*c*. On the second delivery port P2's side of the first pump device 1*a*, the maximum load pressure of the actuators 3*a*-3*e* detected by the first and second shuttle valve sets 208*a* and 208*b* is similarly led to the second unload valve 10*b* and the pressure compensating valves 7*d*-7*f*. Based on the maximum load pressure, the second unload valve 10*b* limits the increase in the delivery pressure of the second delivery port P2 and each pressure compensating valve 7*d*-7*f* controls the differential pressure across the meter-in throttling portion of each flow control valve 6*d*-6*f*.

When the second travel communication valve 215*b* is at the interrupting position (upper position in FIG. 10), on the third delivery port P3's side of the second pump device 1*b*, the maximum load pressure of the actuators 3*e*, 3*f* and 3*h* detected by the third shuttle valve set 208*c* is led to the third unload valve 10*c* and the pressure compensating valves 7*g*-7*i*. Based on the maximum load pressure, the third unload valve 10*c* limits the increase in the delivery pressure of the third delivery port P3 and each pressure compensating valve 7*g*-7*i* controls the differential pressure across the meter-in throttling portion of each flow control valve 6*g*-6*i*. On the fourth delivery port P4's side of the second pump device 1*b*, the maximum load pressure of the actuators 3*d*, 3*g* and 3*h* detected by the fourth shuttle valve set 208*d* is led to the fourth unload valve 10*d* and the pressure compensating valves 7*j*-7*m*. Based on the maximum load pressure, the fourth unload valve 10*d* limits the increase in the delivery pressure of the fourth delivery port P4 and each pressure compensating valve 7*j*-7*m* controls the differential pressure across the meter-in throttling portion of each flow control valve 6*j*-6*m*.

When the second travel communication valve 215*b* is switched to the communicating position (lower position in FIG. 10), on the third delivery port P3's side of the second pump device 1*b*, the maximum load pressure of the actuators 3*d*-3*h* detected by the third and fourth shuttle valve sets 208*c* and 208*d* is led to the third unload valve 10*c* and the pressure compensating valves 7*g*-7*i*. Based on the maximum load pressure, the third unload valve 10*c* limits the increase in the delivery pressure of the third delivery port P3 and each pressure compensating valve 7*g*-7*i* controls the differential pressure across the meter-in throttling portion of each flow control valve 6*g*-6*i*. On the fourth delivery port P4's side of the second pump device 1*b*, the maximum load pressure of the actuators 3*d*-3*h* detected by the third and fourth shuttle valve sets 208*c* and 208*d* is similarly led to the fourth unload valve 10*d* and the pressure compensating valves 7*j*-7*m*. Based on the maximum load pressure, the fourth unload valve 10*d* limits the increase in the delivery pressure of the fourth delivery port P4 and each pressure compensating valve 7*j*-7*m* controls the differential pressure across the meter-in throttling portion of each flow control valve 6*j*-6*m*.

The first pump controller 205*a* includes a first load sensing control unit 212*a*. The first load sensing control unit 212*a* includes load sensing control valves 216*a* and 216*b* and a low pressure selection valve 221*a* instead of the load sensing control valve 16*a*. The low pressure selection valve 221*a* selects the output pressure of the load sensing control valve 216*a* or 216*b* on the low pressure side and outputs the selected output pressure.

The control valve 216*a* includes a spring 216*a*1 for setting the target differential pressure of the load sensing control, a pressure receiving part 216*a*2 situated opposite to the spring 216*a*1, and a pressure receiving part 216*a*3 situated on the same side as the spring 216*a*1. The delivery pressure of the first delivery port P1 is led to the pressure receiving part 216*a*2. When the first travel communication valve 215*a* is at the interrupting position (upper position in FIG. 10), the maximum load pressure of the actuators 3*a*, 3*b* and 3*e* detected by the first shuttle valve set 208*a* is led to the pressure receiving part 216*a*3 of the control valve 216*a*. When the first travel communication valve 215*a* is switched to the communicating position (lower position in FIG. 10), the maximum load pressure of the actuators 3*a*-3*e* detected by the first and second shuttle valve sets 208*a* and 208*b* is led to the pressure receiving part 216*a*3 of the control valve 216*a*. The control valve 216*a* slides according to the balance among the delivery pressure of the first delivery port P1 which is led to the pressure receiving part 216*a*2, the maximum load pressure of the actuators 3*a*, 3*b* and 3*e* or the actuators 3*a*-3*e* which is led to the pressure receiving part 216*a*3, and the biasing force of the spring 216*a*1 and thereby increases/decreases the output pressure. The operation of the control valve 216*a* in these cases is substantially the same as the operation of the control valve 16*a* in the first embodiment.

The control valve 216*b* includes a spring 216*b*1 for setting the target differential pressure of the load sensing control, a pressure receiving part 216*b*2 situated opposite to the spring 216*b*1, and a pressure receiving part 216*b*3 situated on the same side as the spring 216*b*1. The delivery pressure of the second delivery port P2 is led to the pressure receiving part 216b2. When the first travel communication valve 215a is at the interrupting position (upper position in FIG. 10), the maximum load pressure of the actuators 3a, 3c and 3d detected by the second shuttle valve set 208b is led to the pressure receiving part 216b3 of the control valve 216b. When the first travel communication valve 215a is switched to the communicating position (lower position in FIG. 10), the maximum load pressure of the actuators 3a-3e detected by the first and second shuttle valve sets 208a and 208b is led to the pressure receiving part 216b3 of the control valve 216b. The control valve 216b slides according to the balance among the delivery pressure of the second delivery port P2 which is led to the pressure receiving part 216b2, the maximum load pressure of the actuators 3a, 3c and 3d or the actuators 3a-3e which is led to the pressure receiving part 216b3, and the biasing force of the spring 216b1 and thereby increases/decreases the output pressure. The operation of the control valve 216b in these cases is substantially the same as the operation of the control valve 16a in the first embodiment.

The low pressure selection valve 221a selects the output pressure of the load sensing control valve 216a or 216b on the low pressure side and outputs the selected output pressure to the load sensing control piston 17a. According to the output pressure, the load sensing control piston 17a changes the swash plate tilting angle of the first pump device 1a and thereby increases/decreases the delivery flow rates of the first and second delivery ports P1 and P2. The operation of the load sensing control piston 17a in this case is substantially the same as the operation of the load sensing control piston 17a in the first embodiment.

The second pump controller 205b includes a second load sensing control unit 212b. The second load sensing control unit 212b includes load sensing control valve 216c and 216d and a low pressure selection valve 221b instead of the load sensing control valve 16b. The low pressure selection valve 221b selects the output pressure of the load sensing control valve 216c or 216d on the low pressure side and outputs the selected output pressure.

The control valve 216c includes a spring 216c1 for setting the target differential pressure of the load sensing control, a pressure receiving part 216c2 situated opposite to the spring 216c1, and a pressure receiving part 216c3 situated on the same side as the spring 216c1. The delivery pressure of the third delivery port P3 is led to the pressure receiving part 216c2. When the second travel communication valve 215b is at the interrupting position (upper position in FIG. 10), the maximum load pressure of the actuators 3e, 3f and 3h detected by the third shuttle valve set 208c is led to the pressure receiving part 216c3 of the control valve 216c. When the second travel communication valve 215b is switched to the communicating position (lower position in FIG. 10), the maximum load pressure of the actuators 3d-3h detected by the third and fourth shuttle valve sets 208c and 208d is led to the pressure receiving part 216c3 of the control valve 216c. The control valve 216c slides according to the balance among the delivery pressure of the third delivery port P3 which is led to the pressure receiving part 216c2, the maximum load pressure of the actuators 3e, 3f and 3h or the actuators 3d-3h which is led to the pressure receiving part 216c3, and the biasing force of the spring 216c1 and thereby increases/decreases the output pressure. The operation of the control valve 216c in these cases is substantially the same as the operation of the control valve 16b in the first embodiment.

The control valve 216d includes a spring 216d1 for setting the target differential pressure of the load sensing control, a pressure receiving part 216d2 situated opposite to the spring 216d1, and a pressure receiving part 216d3 situated on the same side as the spring 216d1. The delivery pressure of the fourth delivery port P4 is led to the pressure receiving part 216d2. When the second travel communication valve 215b is at the interrupting position (upper position in FIG. 10), the maximum load pressure of the actuators 3d, 3g and 3h detected by the fourth shuttle valve set 208d is led to the pressure receiving part 216d3 of the control valve 216d. When the second travel communication valve 215b is switched to the communicating position (lower position in FIG. 10), the maximum load pressure of the actuators 3d-3h detected by the third and fourth shuttle valve sets 208c and 208d is led to the pressure receiving part 216d3 of the control valve 216d. The control valve 216d slides according to the balance among the delivery pressure of the fourth delivery port P4 which is led to the pressure receiving part 216d2, the maximum load pressure of the actuators 3d, 3g and 3h or the actuators 3d-3h which is led to the pressure receiving part 216d3, and the biasing force of the spring 216d1 and thereby increases/decreases the output pressure. The operation of the control valve 216d in these cases is substantially the same as the operation of the control valve 16b in the first embodiment.

The low pressure selection valve 221b selects the output pressure of the load sensing control valve 216c or 216d on the low pressure side and outputs the selected output pressure to the load sensing control piston 17b. According to the output pressure, the load sensing control piston 17b changes the swash plate tilting angle of the second pump device 1b and thereby increases/decreases the delivery flow rates of the third and fourth delivery ports P3 and P4. The operation of the load sensing control piston 17b in this case is substantially the same as the operation of the load sensing control piston 17b in the first embodiment.

Next, the operation of this embodiment will be described below.

The operations from the <Single Driving> to the <Traveling Operation> (traveling sole operation) explained in the first embodiment are operations at the time other than the traveling combined operation. Since the first and second travel communication valves 215a and 215b are at the interrupting positions (upper positions) in these cases, these operations in this embodiment are basically equivalent to those in the first embodiment. However, this embodiment differs from the first embodiment in that the maximum load pressure is detected separately by the first and second shuttle valve sets 208a and 208b on the first delivery port P1's side and the second delivery port P2's side of the first pump device 1a and separately by the third and fourth shuttle valve sets 208c and 208d on the third delivery port P3's side and the fourth delivery port P4's side of the second pump device 1b and the detected maximum load pressures are respectively led to corresponding pressure compensating valves, unload valves and load sensing control valves.

Specifically, in the above operations, the maximum load pressure of the actuators on the first delivery port P1's side of the first pump device 1a is detected by the first shuttle valve set 208a, the maximum load pressure of the actuators on the second delivery port P2's side is detected by the second shuttle valve set 208b, each maximum load pressure is led to the corresponding load sensing control valve 16a or 16a, pressure compensating valves 7a-7c or 7d-7f and unload valve 10a or 10b, and the load sensing control and the control of the pressure compensating valves and the unload valves are performed according to the maximum load pressure. The second pump device 1b's side also operates in a similar manner; the load sensing control and the control of the pressure compensating valves and the unload valves are performed by detecting the maximum load pressure separately on the third delivery port P3's side and on the fourth delivery port P4's side.

In the case where the combined operation driving at least one of the actuators connected to the first delivery port P1 of the first pump device 1*a* (boom cylinder 3*a*, swing cylinder 3*b*, right travel motor 3*e*) and at least one of the actuators connected to the second delivery port P2 of the first pump device 1*a* (boom cylinder 3*a*, bucket cylinder 3*c*, left travel motor 3*d*) at the same time is performed in the <Simultaneous Driving of Two Actuators on First Pump Device 1*a*'s Side>, the load pressure (maximum load pressure) of the actuators on the first delivery port P1's side detected by the first shuttle valve set 208*a* is led to the pressure compensating valves 7*a*-7*c* and the first unload valve 210*a*, the load pressure (maximum load pressure) of the actuators on the second delivery port P2's side detected by the second shuttle valve set 208*b* is led to the pressure compensating valves 7*d*-7*f* and the second unload valve 210*b*, and the control of the pressure compensating valves and the unload valves is performed separately on the first delivery port P1's side and on the second delivery port P2's side. Accordingly, when a surplus flow occurred in a delivery port on the low load pressure side, the increase in the pressure in the delivery port is limited based on the low load pressure by the unload valve on the same side as the delivery port. Therefore, the pressure loss at the unload valve when the surplus flow returns to the tank is reduced and operation with less energy loss is made possible.

The same applies to the case where the combined operation driving at least one of the actuators connected to the third delivery port P3 of the second pump device 1*b* (right travel motor 3*e*, arm cylinder 3*h*, swing motor 3*f*) and at least one of the actuators connected to the fourth delivery port P4 of the second pump device 1*b* (left travel motor 3*d*, blade cylinder 3*g*, arm cylinder 3*h*) at the same time is performed in the <Simultaneous Driving of Two Actuators on Second Pump Device 1*b*'s Side>; the pressure loss at the unload valve on the low load pressure side when the surplus flow through the unload valve returns to the tank is reduced and operation with less energy loss is made possible.

<Traveling Combined Operation>

The traveling combined operation in which the travel motors 3*d* and 3*e* and at least one of the other actuators, e.g., boom cylinder 3*a*, are driven at the same time will be explained below.

When the left and right travel control levers/pedals and the boom control lever are operated by the operator intending the traveling combined operation, the flow control valves 6*f* and 6*j*, the flow control valves 6*c* and 6*g*, and the flow control valves 6*a* and 6*e* are switched over, and at the same time, the first travel communication valve 215*a* is switched to the communicating position (lower position in FIG. 10). Accordingly, to the left travel motor 3*d*, the hydraulic fluids delivered from the first and second delivery ports P1 and P2 are merged and supplied from the first pump device 1*a*'s side, while the hydraulic fluid delivered from the fourth delivery port P4 is supplied from the second pump device 1*b*'s side. To the right travel motor 3*e*, the hydraulic fluids delivered from the first and second delivery ports P1 and P2 are merged and supplied from the first pump device 1*a*'s side, while the hydraulic fluid delivered from the third delivery port P3 is supplied from the second pump device 1*b*'s side. To the boom cylinder 3*a*, the rest of the hydraulic fluid from the first and second delivery ports P1 and P2 supplied to the travel motor 3*d* or 3*e* is supplied.

In this case, on the first pump device 1*a*'s side, the first travel communication valve 215*a* is switched to the communicating position (lower position in FIG. 10). Therefore, the maximum load pressure of the actuators 3*a*-3*e* detected by the first and second shuttle valve sets 208*a* and 208*b* is led to the load sensing control valves 216*a* and 216*b*, the pressure compensating valves 7*a*-7*c* and 7*d*-7*f*, and the unload valves 10*a* and 10*b*, and the load sensing control and the control of the pressure compensating valves and the unload valves are performed according to the maximum load pressure. In contrast, on the second pump device 1*b*'s side, the second travel communication valve 215*b* is held at the interrupting position (upper position in FIG. 10). Therefore, the maximum load pressure is detected separately on the third delivery port P3's side and on the fourth delivery port P4's side, each maximum load pressure is led to the corresponding load sensing control valve 216*c* or 216*d*, pressure compensating valves 7*g*-7*i* or 7*j*-7*m* and unload valve 10*c* or 10*d*, and the load sensing control and the control of the pressure compensating valves and the unload valves are performed according to each maximum load pressure.

Here, the case where the straight traveling is performed in the traveling combined operation will be explained.

When the left and right travel control levers/pedals are operated by the same amount by the operator intending the straight traveling in the traveling combined operation, the flow control valves 6*f* and 6*j* and the flow control valves 6*c* and 6*g* are switched over so that the stroke amount (opening area) of the flow control valve 6*f*/6*j* equals the stroke amount (opening area–demanded flow rate) of the flow control valve 6*c*/6*g*. As mentioned above, to the left travel motor 3*d*, the hydraulic fluids delivered from the first and second delivery ports P1 and P2 are merged and supplied from the first pump device 1*a*'s side, while the hydraulic fluid delivered from the fourth delivery port P4 is supplied from the second pump device 1*b*'s side. To the right travel motor 3*e*, the hydraulic fluids delivered from the first and second delivery ports P1 and P2 are merged and supplied from the first pump device 1*a*'s side, while the hydraulic fluid delivered from the third delivery port P3 is supplied from the second pump device 1*b*'s side. Accordingly, also in the traveling combined operation, the supply flow rate of the left travel motor 3*d* and that of the right travel motor 3*e* become equal to each other and the vehicle is allowed to travel straight without meandering.

Specifically, assuming that the delivery flow rates of the first through fourth delivery ports P1, P2, P3 and P4 are Q1, Q2, Q3 and Q4, respectively, and the flow rates of the hydraulic fluid supplied to the left and right travel motors 3*d* and 3*e* are Qd and Qe, respectively, and the flow rate of the hydraulic fluid supplied to the boom cylinder 3*a* that is the actuator other than the travel motors is Qa, the flow rates Qd and Qe of the hydraulic fluid supplied to the left and right travel motors 3*d* and 3*e* can be determined as explained below.

From the first pump device 1*a*'s side, ½ of Q1+Q2−Qa that is total delivery flow rate Q1+Q2 of the first and second delivery ports P1 and P2 minus the flow rate Qa of the hydraulic fluid supplied to the boom cylinder 3*a* is supplied to each of the left and right travel motors 3*d* and 3*e*. Here, Q1+Q2−Qa is multiplied by ½ since the stroke amount (opening area) of the flow control valve 6*f* and the stroke amount (opening area–demanded flow rate) of the flow control valve 6*c* are equal to each other. From the second pump device 1*b*'s side, ½ of the total delivery flow rate Q3+Q4 of the third and fourth delivery ports p3 and p4 is supplied to each of the left and right travel motors 3*d* and 3*e*. Also in this case, Q3+Q4 is multiplied by ½ since the stroke amount (opening area) of the flow control valve 6*j* and the stroke amount (opening area–demanded flow rate) of the flow control valve 6*g* are equal to each other. Therefore, the flow rates Qd and Qe of the hydraulic fluid supplied to the left and right travel motors 3*d* and 3*e* are expressed as follows:

$$\text{right travel supply flow rate } Qd=(Q1+Q2-Qa)/2+(Q3+Q4)/2$$

$$\text{left travel supply flow rate } Qe=(Q1+Q2-Qa)/2+(Q3+Q4)/2$$

Since Qd=Qe is satisfied as above, the vehicle is allowed to travel straight without meandering.

The above example of the traveling combined operation is about the case where the travel motors 3*d* and 3*e* and the boom cylinder 3*a* are driven at the same time. As another example of the traveling combined operation, there is a traveling combined operation in which the travel motors 3*d* and 3*e* and an actuator driven by the hydraulic fluid delivered from only one of the first and second delivery ports P1 and P2 of the first pump device 1*a* (swing cylinder 3*b*, bucket cylinder 3*c*) or an actuator driven by the hydraulic fluid delivered from only one of the third and fourth delivery ports P3 and P4 of the second pump device 1*b* (swing motor 3*f*, blade cylinder 3*g*) are driven at the same time. In this embodiment, the vehicle is allowed to travel straight without meandering even when such a traveling combined operation is performed.

As an example of such a traveling combined operation, a traveling combined operation in which the travel motors 3*d* and 3*e* and the bucket cylinder 3*c* are driven at the same time will be considered below. The flow rate of the hydraulic fluid supplied to the bucket cylinder 3*c* is assumed to be Qc. Since the delivery flow of the first delivery port P1 and that of the second delivery port P2 are merged and supplied in this embodiment, the flow rates Qd and Qe of the hydraulic fluid supplied to the left and right travel motors 3*d* and 3*e* are expressed as follows also in such a traveling combined operation similarly to the case of the traveling combined operation in which the travel motors 3*d* and 3*e* and the boom cylinder 3*a* are driven at the same time:

$$\text{right travel supply flow rate } Qd=(Q1+Q2-Qc)/2+(Q3+Q4)/2$$

$$\text{left travel supply flow rate } Qe=(Q1+Q2-Qc)/2+(Q3+Q4)/2$$

The relationship Qd=Qe is satisfied also in this case.

As explained above, in this embodiment, the vehicle is allowed to travel straight without meandering in any type of traveling combined operation.

Incidentally, while the fourth embodiment is configured by providing the first through fourth shuttle valve sets 208*a*-208*d*, the first and second travel communication valves 215*a* and 215*b*, the load sensing control valves 216*a*-216*d* and the low pressure selection valves 221*a* and 221*b* and having the first and second travel communication valves 215*a* and 215*b* perform the communication/interruption on both the delivery ports and the output hydraulic lines of the maximum load pressure, it is also possible to configure the first and second travel communication valves 215*a* and 215*b* to perform the communication/interruption on the delivery ports only, while configuring the rest of the circuitry in the same way as the first embodiment. Also in this case, the effect of securing the straight traveling performance can be achieved by the switching of the first and second travel communication valves 215*a* and 215*b* to the communicating positions at the time of the traveling combined operation.

Other Examples

The above embodiments have been described by taking a hydraulic excavator as an example of the construction machine and the boom cylinder for driving the boom of the front work implement of the hydraulic excavator and the arm cylinder for driving the arm of the front work implement as an example of the first and second actuators that are driven at the same time in a certain combined operation of the construction machine while producing a relatively large supply flow rate difference therebetween. However, the first and second actuators can also be actuators other than the boom cylinder or the arm cylinder as long as the actuators are those driven at the same time in a certain combined operation while producing a relatively large supply flow rate difference therebetween. For example, the boom cylinder and the swing motor are actuators driven at the same time in a combined operation of the swinging and the boom elevation while producing a relatively large supply flow rate difference therebetween (boom cylinder flow rate≥swing motor flow rate). By modifying the hydraulic circuit to connect the swing motor to both the third and fourth delivery ports, effects similar to those in the case of the leveling operation by use of the boom and the arm can be achieved.

While the above embodiments have been described by taking the travel motors for driving the left and right crawlers as an example of the third and fourth actuators that are driven at the same time in another operation of the construction machine while achieving a prescribed function by their supply flow rates becoming equivalent to each other, the third and fourth actuators can also be actuators other than the travel motors as long as the actuators are those driven at the same time in a certain operation while achieving a prescribed function by their supply flow rates becoming equivalent to each other.

Further, the present invention is applicable also to construction machines other than hydraulic excavators as long as the construction machine comprises actuators satisfying such operational conditions of the first and second actuators or the third and fourth actuators.

Furthermore, the load sensing system described in the above embodiments is just an example and can be modified in various ways. For example, the target compensation differential pressure may also be set by providing a differential pressure reducing valve that outputs the differential pressure between the pump delivery pressure and the maximum load pressure as the absolute pressure and leading the output pressure of the differential pressure reducing valve to the pressure compensating valve. It is also possible to feed back the output pressure of the differential pressure reducing valve to the load sensing control valve. The target differential pressure of the load sensing control may also be set by providing a differential pressure reducing valve that outputs pressure varying depending on the engine revolution speed as the absolute pressure and leading the output pressure of the differential pressure reducing valve to the load sensing control valve.

DESCRIPTION OF REFERENCE CHARACTERS

1*a* first pump device
1*b* second pump device

2 prime mover (diesel engine)
3*a*-3*h* actuator
3*a* boom cylinder
3*d* left travel motor
3*e* right travel motor
3*h* arm cylinder
4 control valve
5*a* first pump controller
5*b* second pump controller
6*a*-6*m* flow control valve
7*a*-7*m* pressure compensating valve
8*a* first shuttle valve set
8*b* second shuttle valve set
9*a*-9*d* spring
10*a*-10*d* unload valve
12*a* first load sensing control unit
12*b* second load sensing control unit
13*a* first torque control unit
13*b* second torque control unit
15*a*, 15*b* shuttle valve
16*a*, 16*b* load sensing control valve
17*a*, 17*b* load sensing control piston
18*a* first torque control piston
19*a* second torque control piston
18*b* third torque control piston
19*b* fourth torque control piston
204 control valve
205*a* first pump controller
205*b* second pump controller
208*a*-208*d* shuttle valve set
215*a* first travel communication valve
215*b* second travel communication valve
212*a* first load sensing control unit
212*b* second load sensing control unit
216*a*, 216*b* load sensing control valve
221*a* low pressure selection valve
216*c*, 216*d* load sensing control valve
221*b* low pressure selection valve

The invention claimed is:

1. A hydraulic drive system for a construction machine comprising:

a first pump device having first and second delivery ports;

a second pump device having third and fourth delivery ports; and a plurality of actuators which are driven by hydraulic fluid delivered from the first and second delivery ports of the first pump device and hydraulic fluid delivered from the third and fourth delivery ports of the second pump device, wherein:

the first pump device includes a first pump controller which is provided for the first and second delivery ports as a common controller, and the second pump device includes a second pump controller which is provided for the third and fourth delivery ports as a common controller, and the first pump controller includes a first load sensing control unit which controls displacement of the first hydraulic pump device so that delivery pressures of the first and second delivery ports of the first hydraulic pump device become higher than maximum load pressure of the actuators driven by the hydraulic fluid delivered from the first and second delivery ports by a prescribed pressure and a first torque control unit which performs limiting control of the displacement of the first hydraulic pump device so that absorption torque of the first hydraulic pump device does not exceed a prescribed value, and the second pump controller includes a second load sensing control unit which controls displacement of the second hydraulic pump device so that delivery pressures of the third and fourth delivery ports of the second hydraulic pump device become higher than maximum load pressure of the actuators driven by the hydraulic fluid delivered from the third and fourth delivery ports by a prescribed pressure and a second torque control unit which performs limiting control of the displacement of the second hydraulic pump device so that absorption torque of the second hydraulic pump device does not exceed a prescribed value, and the plurality of actuators include first and second actuators which are driven at the same time in a certain combined operation of the construction machine while producing a relatively large supply flow rate difference therebetween, and the first actuator is connected so that hydraulic fluids delivered from the first and second delivery ports of the first pump device are merged and supplied to the first actuator, and the second actuator is connected so that hydraulic fluids delivered from the third and fourth delivery ports of the second pump device are merged and supplied to the second actuator, and the plurality of actuators include third and fourth actuators which are driven at the same time in another operation of the construction machine while achieving a prescribed function by their supply flow rates becoming equivalent to each other, and the third actuator is connected so that hydraulic fluid delivered from one of the first and second delivery ports of the first pump device and hydraulic fluid delivered from one of the third and fourth delivery ports of the second pump device are merged and supplied to the third actuator, and the fourth actuator is connected so that hydraulic fluid delivered from the other of the first and second delivery ports of the first pump device and hydraulic fluid delivered from the other of the third and fourth delivery ports of the second pump device are merged and supplied to the fourth actuator.

2. The hydraulic drive system for a construction machine according to claim 1, further comprising:

a first travel communication valve which is arranged between the first and second delivery ports of the first pump device, situated at an interrupting position for interrupting communication between the first and second delivery ports at the time other than combined operation in which the third and fourth actuators and at least one of other actuators related to the first pump device are driven at the same time, and switched to a communicating position for communicating the first and second delivery ports to each other at the time of the combined operation in which the third and fourth actuators and at least one of other actuators related to the first pump device are driven at the same time; and a second travel communication valve which is arranged between the third and fourth delivery ports of the second pump device, situated at an interrupting position for interrupting communication between the third and fourth delivery ports at the time other than combined operation in which the third and fourth actuators and at least one of other actuators related to the second pump device are driven at the same time, and switched to a communicating position for communicating the third and fourth delivery ports to each other at the time of the combined operation in which the third and fourth actuators and at least one of other actuators related to the second pump device are driven at the same time.

3. The hydraulic drive system for a construction machine according to claim 1, wherein:

the construction machine is a hydraulic excavator having a front work implement, and the first actuator is a boom cylinder for driving a boom of the front work implement, and the second actuator is an arm cylinder for driving an arm of the front work implement.

4. The hydraulic drive system for a construction machine according to claim 1, wherein:

the construction machine is a hydraulic excavator having a lower track structure equipped with left and right crawlers, and the third actuator is a travel motor for driving one of the left and right crawlers, and the fourth actuator is a travel motor for driving the other of the left and right crawlers.

5. The hydraulic drive system for a construction machine according to claim 1, wherein each of the first and second pump devices is a hydraulic pump of the split flow type having a single displacement control mechanism.

6. The hydraulic drive system for a construction machine according to claim 1, wherein:

the first pump torque control unit of the first pump device controls the displacement of the first hydraulic pump device so that total absorption torque of the first and second hydraulic pump devices does not exceed a prescribed value by feeding back not only the delivery pressures of the first and second delivery ports of the first hydraulic pump device related to itself but also the delivery pressures of the third and fourth delivery ports of the second hydraulic pump device, and the second pump torque control unit of the second pump device controls the displacement of the second hydraulic pump device so that total absorption torque of the first and second hydraulic pump devices does not exceed a prescribed value by feeding back not only the delivery pressures of the third and fourth delivery ports of the second hydraulic pump device related to itself but also the delivery pressures of the first and second delivery ports of the first hydraulic pump device.

7. A hydraulic drive system for a construction machine, comprising:

a first pump device having first and second delivery ports;

a second pump device having third and fourth delivery ports; and a plurality of actuators which are driven by hydraulic fluid delivered from the first and second delivery ports of the first pump device and hydraulic fluid delivered from the third and fourth delivery ports of the second pump device, wherein:

the first pump device includes a first pump controller which is provided for the first and second delivery ports as a common controller, and the second pump device includes a second pump controller which is provided for the third and fourth delivery ports as a common controller, and the first pump controller includes a first load sensing control unit which controls displacement of the first hydraulic pump device so that delivery pressures of the first and second delivery ports of the first hydraulic pump device become higher than maximum load pressure of the actuators driven by the hydraulic fluid delivered from the first and second delivery ports by a prescribed pressure and a first torque control unit which performs limiting control of the displacement of the first hydraulic pump device so that absorption torque of the first hydraulic pump device does not exceed a prescribed value, and the second pump controller includes a second load sensing control unit which controls displacement of the second hydraulic pump device so that delivery pressures of the third and fourth delivery ports of the second hydraulic pump device become higher than maximum load pressure of the actuators driven by the hydraulic fluid delivered from the third and fourth delivery ports by a prescribed pressure and a second torque control unit which performs limiting control of the displacement of the second hydraulic pump device so that absorption torque of the second hydraulic pump device does not exceed a prescribed value, and the plurality of actuators include first and second actuators which are driven at the same time in a certain combined operation of the construction machine while producing a relatively large supply flow rate difference therebetween, and the first actuator is connected so that hydraulic fluids delivered from the first and second delivery ports of the first pump device are merged and supplied to the first actuator, and the second actuator is connected so that hydraulic fluids delivered from the third and fourth delivery ports of the second pump device are merged and supplied to the second actuator, and the first pump torque control unit of the first pump device controls the displacement of the first hydraulic pump device so that total absorption torque of the first and second hydraulic pump devices does not exceed a prescribed value by feeding back not only the delivery pressures of the first and second delivery ports of the first hydraulic pump device related to itself but also the delivery pressures of the third and fourth delivery ports of the second hydraulic pump device, and the second pump torque control unit of the second pump device controls the displacement of the second hydraulic pump device so that total absorption torque of the first and second hydraulic pump devices does not exceed a prescribed value by feeding back not only the delivery pressures of the third and fourth delivery ports of the second hydraulic pump device related to itself but also the delivery pressures of the first and second delivery ports of the first hydraulic pump device.

* * * * *